US011664589B2

(12) United States Patent
Koul et al.

(10) Patent No.: US 11,664,589 B2
(45) Date of Patent: May 30, 2023

(54) 5G MIMO ANTENNA ARRAY WITH REDUCED MUTUAL COUPLING

(71) Applicant: Synergy Microwave Corporation, Paterson, NJ (US)

(72) Inventors: Shiban K. Koul, Delhi (IN); Ajay Kumar Poddar, Elmwood Park, NJ (US); Sukomal Dey, Palakkad District (IN); Ulrich L. Rohde, Upper Saddle River, NJ (US)

(73) Assignee: Synergy Microwave Corporation, Paterson, NJ (US)

( * ) Notice: Subject to any disclaimer, the term of this patent is extended or adjusted under 35 U.S.C. 154(b) by 49 days.

(21) Appl. No.: 17/197,644

(22) Filed: Mar. 10, 2021

(65) Prior Publication Data

US 2022/0294107 A1    Sep. 15, 2022

(51) Int. Cl.
*H01Q 1/52* (2006.01)
*H01Q 9/06* (2006.01)
*H01Q 21/06* (2006.01)
*H04B 7/0456* (2017.01)

(52) U.S. Cl.
CPC ............ *H01Q 1/523* (2013.01); *H01Q 9/065* (2013.01); *H01Q 21/065* (2013.01); *H04B 7/0469* (2013.01)

(58) Field of Classification Search
CPC .......... H01P 7/08; H01P 1/2005; H01Q 1/38; H01Q 15/006; H01Q 15/14; H01Q 1/521; H01Q 1/523; H01Q 9/065; H01Q 21/065; H01L 2223/6677; H05K 1/0236; H05K 1/0298; H04B 7/0469
See application file for complete search history.

(56) References Cited

U.S. PATENT DOCUMENTS

| | | | |
|---|---|---|---|
| 6,583,766 B1 | 6/2003 | Rawnick et al. | |
| 6,943,650 B2 | 9/2005 | Ramprasad et al. | |
| 7,042,419 B2 | 5/2006 | Werner et al. | |
| 7,427,967 B2 | 9/2008 | Hughes | |
| 7,982,673 B2 | 7/2011 | Orton et al. | |
| 8,153,907 B2 | 4/2012 | Park et al. | |

(Continued)

FOREIGN PATENT DOCUMENTS

| | | | |
|---|---|---|---|
| CN | 102299418 B | * 9/2013 | |
| CN | 108461912 A | * 8/2018 | ............... H01Q 1/38 |
| CN | 110112552 A | * 8/2019 | |

OTHER PUBLICATIONS

L. Kurra, M. P. Abegaonkar, A. Basu, and S. K. Koul, "A compact uniplanar EBG structure and its application in band-notched UWB filter," International Journal of Microwave and Wireless Technologies, vol. 5, No. 4, pp. 491-498, Feb. 2013.

(Continued)

*Primary Examiner* — Vibol Tan
(74) *Attorney, Agent, or Firm* — Lerner David LLP

(57) ABSTRACT

An electromagnetic bandgap (EBG) structure for improving isolation characteristics between antennas of a MIMO antenna array. The structure includes an EBG unit cell formed on a metal layer over a composite dielectric substrate and over a ground plane. The ground plane may include a defected ground structure to further improve isolation, and another metal layer including a substrate integrated waveguide may be included at an interface of the composite dielectric substrate.

36 Claims, 30 Drawing Sheets

(56) References Cited

U.S. PATENT DOCUMENTS

| | | | |
|---|---|---|---|
| 8,816,936 B2 | 8/2014 | Toyao et al. | |
| 8,866,691 B2 | 10/2014 | Montgomery et al. | |
| 9,153,873 B2 | 10/2015 | Ng et al. | |
| 9,323,877 B2* | 4/2016 | Ng | H01Q 1/40 |
| 9,755,317 B2* | 9/2017 | Grelier | H01Q 15/14 |
| 9,853,363 B2 | 12/2017 | Ali et al. | |
| 10,505,279 B2* | 12/2019 | Celik | H01Q 9/0435 |
| 10,826,183 B2* | 11/2020 | Celik | H01Q 1/38 |

OTHER PUBLICATIONS

J. Zhang, G. Ci, Y. Cao, N. Wang and H. Tian, "A wide band-gap slot fractal UC-EBG based on Moore space-filling geometry for microwave application," IEEE Antennas Wireless Propag. Lett., vol. 16, pp. 33-37, Apr. 2016.

S. D. Assimonis, T. V. Yioultsis and C. S. Antonopoulos, "Design and optimization of uniplanar EBG structures for low profile antenna applications and mutual coupling reduction," IEEE Trans. Antennas Propag., vol. 60, No. 10, pp. 4944-4949, Oct. 2012.

M. J. Al-Hasan, T. A. Denidni and A. R. Sebak, "Millimeter-wave compact EBG structure for mutual coupling reduction applications," IEEE Trans Antennas Propag., vol. 63, No. 2, pp. 823-828, Feb. 2015.

X. Yang, Y. Liu, Y. Xu and S. Gong, "Isolation enhancement in patch antenna array with fractal UC-EBG structure and cross slot," IEEE Antennas Wireless Propag. Lett., vol. 16, pp. 2175-2178, May 2017.

C. B. Mulenga and J. A. Flint, "Planar electromagnetic bandgap structures based on polar curves and mapping functions," IEEE Trans. Antennas Propag., vol. 58, No. 3, pp. 790-797, Mar. 2010.

X. Lin, B. Seet, F. Joseph and E. Li, "Flexible fractal electromagnetic bandgap for millimeter-wave wearable antennas," IEEE Antennas Wireless Propag. Lett., vol. 17, No. 7, pp. 1281-1285, Jul. 2018.

X. Chen, L. Li, C. H. Liang, Z. J. Su and C. Zhu, "Dual-band high impedance surface with mushroom-type cells loaded by symmetric meandered slots," IEEE Trans. Antennas Propag., vol. 60, No. 10, pp. 4677-4687, Oct. 2012.

P. P. Bhavarthe, S. S. Rathod and K. T. V. Reddy, "A compact two via slot-type electromagnetic bandgap structure," IEEE Microw Wireless Compon. Lett., vol. 27, No. 5, pp. 446-448, May 2017.

P. P. Bhavarthe, S. S. Rathod and K. T. V. Reddy, "A compact dual band gap electromagnetic band gap structure," IEEE Trans. Antennas Propag., vol. 67, No. 1, pp. 596-600, Jan. 2019.

P. P. Bhavarthe, S. S. Rathod and K. T. V. Reddy, "A compact two-via hammer spannertype polarization-dependent electromagnetic bandgap structure," IEEE Microw. Wireless Compon. Lett., vol. 28, No. 4, pp. 284-286, Apr. 2018.

Li Yang, Mingyan Fan, Fanglu Chen, Jingzhao She and Zhenghe Feng, "A novel compact electromagnetic-bandgap (EBG) structure and its applications for microwave circuits," IEEE Trans. Microw. Theory Techn., vol. 53, No. 1, pp. 183-190, Jan. 2005.

M. F. Abedin, M. Z. Azad and M. Ali, "Wideband smaller unit-Cell planar EBG structures and their application," IEEE Trans. Antennas Propag., vol. 56, No. 3, pp. 903-908, Mar. 2008.

B. Mohajer-Iravani and O. M. Ramahi, "Radiating emissions from the planar electromagnetic bandgap (EBG) structures," in Proc. IEEE Int. Symp. Electromagn. Compat., Fort Lauderdale, FL, Jul. 25-30, 2010, pp. 780-783.

R. Coccioli, Fei-Ran Yang, Kuang-Ping Ma and T. Itoh, "Aperture-coupled patch antenna on UC-PBG substrate," IEEE Trans. Microw. Theory Techn., vol. 47, No. 11, pp. 2123-2130, Nov. 1999.

D. Sievenpiper, Lijun Zhang, R. F. J. Broas, N. G. Alexopolous and E. Yablonovitch, "High-impedance electromagnetic surfaces with a forbidden frequency band," IEEE Trans. Microw. Theory Techn., vol. 47, No. 11, pp. 2059-2074, Nov. 1999.

K. S. Vishvaksenan, K. Mithra, R. Kalaiarasan and K. S. Raj, "Mutual Coupling Reduction in Microstrip Patch Antenna Arrays Using Parallel Coupled-Line Resonators," IEEE Antennas Wireless Propag. Lett., vol. 16, pp. 2146-2149, May 2017.

Z. Qamar, U. Naeem, S. A. Khan, M. Chongcheawchamnan and M. F. Shafique, "Mutual coupling reduction for high-performance densely packed patch antenna arrays on finite substrate," IEEE Trans. Antennas Propag., vol. 64, No. 5, pp. 1653-1660, May 2016.

K. Wei, J. Li, L. Wang, Z. Xing and R. Xu, "Mutual coupling reduction by novel fractal defected ground structure bandgap filter," IEEE Trans Antennas Propag., vol. 64, No. 10, pp. 4328-4335, Oct. 2016.

Y. Cheng, X. Ding, W. Shao and B. Wang, "Reduction of mutual coupling between patch antennas using a polarization-conversion isolator," IEEE Antennas Wireless Propag. Lett., vol. 16, pp. 1257-1260, Nov. 2016.

A. Jafargholi, A. Jafargholi and J. H. Choi, "Mutual coupling reduction in an array of patch antennas using CLL metamaterial superstrate for MIMO applications," IEEE Trans. Antennas Propag., vol. 67, No. 1, pp. 179-189, Jan. 2019.

J. Lee, S. Kim and J. Jang, "Reduction of mutual coupling in planar multiple antenna by using 1-D EBG and SRR structures," IEEE Trans Antennas Propag., vol. 63, No. 9, pp. 4194-4198, Sep. 2015.

JY. Liu, X. Yang, Y. Jia and Y. J. Guo, "A low correlation and mutual coupling MIMO antenna," IEEE Access, vol. 7, pp. 127384-127392, Sep. 2019.

M. Al-Hasan, I. Ben Mabrouk, E. R. F. Almajali, M. Nedil and T. A. Denidni, "Hybrid isolator for mutual-coupling reduction in millimeter-wave MIMO antenna systems," IEEE Access, vol. 7, pp. 58466-58474, May 2019.

R. Selvaraju, M. H. Jamaluddin, M. R. Kamarudin, J. Nasir and M. H. Dahri, "Mutual coupling reduction and pattern error correction in a 5G beamforming linear array using CSRR," IEEE Access, vol. 6, pp. 65922-65934, Oct. 2018.

S. Gupta, Z. Briqech, A. R. Sebak and T. Ahmed Denidni, "Mutual-coupling reduction using metasurface corrugations for 28 GHz MIMO applications," IEEE Antennas Wireless Propag. Lett., vol. 16, pp. 2763-2766, Aug. 2017.

Y. Zhang, J. Deng, M. Li, D. Sun and L. Guo, "A MIMO dielectric resonator antenna with improved isolation for 5G mm-wave applications," IEEE Antennas Wireless Propag. Lett., vol. 18, No. 4, pp. 747-751, Apr. 2019.

* cited by examiner

700

5G MIMO ANTENNA ARRAY WITH REDUCED MUTUAL COUPLING

BACKGROUND

Modern wireless communication demands transmission of a large amount of data within a short duration. Also, exponential growth in mobile users requires high data throughput, low latency and enhanced channel capacity. Needs of uninterrupted high definition (HD) video streaming, online gaming as well as high data traffic for mobile terminal user have boosted the development in wireless communication systems. Future $5^{th}$ generation (5G) mobile communication technologies require an even broader spectrum and higher energy efficiency to support data rates of 1 to 10 Gbps and latency times as low as 1 ms. Single antenna/antenna arrays with broad bandwidth are not always sufficient to fulfill these requirements. Also multipath propagation of the signal between transmitter and receiver causes shadowing and fading of the received signal.

Multiple antenna elements at both the transmitter and the receiver are typically used to resolve these problems, avoid fading losses, and overcome the data throughput limit faced by conventional single-input single-output (SISO) wireless communication systems. This is commonly referred to as a multiple-input multiple-output (MIMO) communication system. MIMO technology uses multiple data streams sent and received by the multiple antenna elements on the transmitter and receiver ends. Integration of a large number of antenna elements within the limited space of a MIMO system (such as a base station, mobile terminal, or both) on the scale required for 5G applications is typically referred to as Massive MIMO.

However, the MIMO system is subject to problems, such as the multipath propagation problem due to high correlation in multiple signal broadcasting, as well as mutual coupling within the MIMO system. Mutual coupling refers to the amount of cross talk between the independent radiating sources. It can be caused due to surface wave propagation and space wave coupling in the MIMO antenna near field, and it can have a significant effect on the performance of the system. For instance, mutual coupling can cause any one or combination of changes in input impedance of the system phased array antenna with scanning angle (known as scan blindness), a reduction in channel capacity, and bandwidth losses.

Some existing decoupling techniques include neutralization lines, parasitic scatters, eigen-mode decomposition, complementary split ring resonators (CSRR), polarization isolators, metamaterial superstrates, and asymmetrical coplanar strip (ACPS) walls, electronic band gap (EBG) and defected ground structures (DGS). However, past decoupling attempts using these techniques have not achieved decoupling at high frequencies, such as frequencies above 12 GHz, and thus have not resulted in elements that are suitable for 5G applications or other high-frequency applications.

SUMMARY

The present disclosure reduces mutual coupling between circuit elements of the MIMO system by providing an electronic bandgap (EBG) structure.

EBG structures are artificially engineered two-dimensional or three-dimensional periodic structures that include metallic, dielectric or metallic-dielectric materials that exhibit unique properties including wave dispersion characteristics, a frequency bandgap, to restrain the propagation of surface waves at the structure, and zero reflection phase due to high surface impedance, at a resonant frequency for incident electromagnetic (EM) waves. The EBG structures are capable of controlling electromagnetic wave propagation over specific frequency ranges, regardless of an incident angle and polarization state of the electromagnetic wave. EBG structures are typically used to avoid mixing between analog circuit and digital circuit components on a printed circuit board (PCB) due to ground noise coupling, or to improve radiation characteristics of a microstrip antenna. However, the EBG structures are limited to operate at the lower end of the microwave frequency range, as it is difficult to reduce the unit cell size to function at millimeter wave frequencies. By contrast, the present disclosure presents various embodiments of an EBG structure that can be used in millimeter wave frequency applications, such as MIMO antenna arrays.

In some embodiments, a sub-wavelength uniplanar EBG structure is provided. Unlike mushroom EBG structures that include metallic vias to provide a direct current path through the substrate between the adjacent unit cells arranged in a two-dimensional periodic arrangement, the uniplanar EBG structures do not include vias. The uniplanar EBG structures of the present disclosure have a unit cell periodicity of less than one half wavelength, and in some cases less than a quarter wavelength. These structures also have a relatively low profile.

In some embodiments, the EBG structure is coupled with a defected ground structure (DGS) in the ground plane. This causes resonance for frequencies within the frequency bandgap of the EBG structure. The effect of the DGS can be understood by treating it as an equivalent magnetic current. The increase in magnetic coupling between the top EBG lattice and the DGS in the ground causes high reduction of the surface wave at the resonance frequency.

The example EBG structures and antenna arrays of the present disclosure are suitable for operation at millimeter wave frequencies, including but not limited to 9 GHz and 28 GHz. These frequencies are in demand for current and future 5G wireless communication devices and systems. The reduced effect of coupling MIMO channels between the elements improve dense packing of the elements in a limited space. The reduced coupling also permits for size miniaturization of the MIMO system, as well as increased scanning range of the phased array due to isolation enhancement between the MIMO channels.

One aspect of the present disclosure is directed to an electromagnetic bandgap (EBG) unit cell structure including: an electrically conductive ground plane; a first dielectric substrate formed on a top surface of the electrically conductive ground plane and having a first dielectric constant; a second dielectric substrate formed on a top surface of the first dielectric substrate and having a second dielectric constant different from the first dielectric constant, wherein the EBG unit cell structure is configured to reflect propagating millimeter waves at an interface between the first and second dielectric substrates; and a top metal layer formed on a top surface of the second dielectric substrate and including an EBG pattern formed in the top metal layer.

In some examples, the EBG pattern may have a periodicity that is between 2 mm and 10 mm.

In some examples, the EBG pattern may include a ring divided into four sections separated from one another by respective gaps, and each ring section may include a first end connected to a first metal strip extending radially in a direction toward a center of the EBG pattern and a second metal strip extending radially in a direction away from the center of the EBG pattern.

In some examples, each second metal strip may be connected to a respective patch configured to connect to a corresponding coplanar patch of an adjacent EBG unit cell, and each patch of the EBG pattern may include a slit extending radially in a direction toward the center of the EBG pattern.

In some examples, a structure of the EBG pattern may be defined by no more than: (i) a radial distance from the center to the ring; (ii) a radial distance from the center to the patch; (iii) a periodicity; (iv) a gap width; (v) a ring and metal strip width; and (vi) a slit length.

In some examples, an irreducible Brillouin zone of the EBG pattern may be a triangular region designated by vertices Γ, X and M.

In some examples, the EBG pattern may exhibit a frequency bandgap centered between 27-29 GHz and having a fractional bandwidth (FBW) of at least 20%.

Another aspect of the disclosure is directed to an EBG lattice structure including a plurality of interconnected EBG unit cell structures according to any of the embodiments described herein, wherein an overall inductance of the EBG lattice structure is greater than an individual EBG unit cell structure.

In some examples, the interconnected EBG unit cell structures may be a 3×2 matrix of interconnected EBG unit cell structures.

In some examples, a periodicity of the plurality of interconnected EBG unit cell structures may satisfy a periodic boundary condition.

In some examples, the EBG lattice structure may further include: a first open ended transmission line formed in the top metal layer; and a second open ended transmission line formed in the top metal layer, and the EBG pattern formed in the top metal layer is positioned between and loaded by the first and second open ended transmission lines.

In some examples, the EBG lattice structure may further include: a middle metal layer positioned between the first dielectric substrate and the second dielectric substrate; a substrate integrated waveguide (SIW) formed in the middle metal layer; and a defected ground structure (DGS) formed in the ground plane.

In some examples, the DGS may be positioned directly underneath the EBG pattern.

Another aspect of the disclosure is directed to a multiple-input multiple-output (MIMO) antenna array including: a first proximity-coupled microstrip antenna; a second proximity coupled microstrip antenna; and an EBG lattice structure according to any of the embodiments described herein.

In some examples, the first and second open ended transmission lines may be configured to create a transmission zero at or near the center of the frequency bandgap exhibited by the EBG lattice structure.

In some examples, the center of the frequency bandgap may be 27.5 GHz.

In some examples, the first and second open ended transmission lines may be configured to reduce coupling between the two microstrip antennas by at least 10 dB over a range from 27 GHz to 29 GHz.

Another aspect of the present disclosure is directed to a multiple-input multiple-output (MIMO) antenna array including: a first proximity-coupled microstrip antenna; a second proximity coupled microstrip antenna; and an EBG lattice structure according to any of the embodiments described herein.

In some examples, the SIW may be configured to embrace the first and second microstrip antennas and to confine propagation of surface waves to a space within the walls of the SIW cavity.

In some examples, the SIW may include sidewalls comprising two rows of vias, and may be configured to direct radiation of the first and second microstrip antennas in a single direction, wherein a front-to-back ratio of radiation in the MIMO antenna array is between 20 dB to 30 dB.

In some examples, a vertical length of the DGS may be 1.2 mm.

In some examples, the antenna array may be configured to operate at a millimeter wave operating frequency, and each of a length and width of the EBG unit cell structure may be about a quarter wavelength to a half wavelength of the operating signal wavelength of the MIMO antenna array.

In some examples, the DGS may have a length and width less than a wavelength of the operating signal wavelength of the MIMO antenna array.

In some examples, the EBG lattice structure and the DGS may be configured to reduce coupling between the two microstrip antennas by at least 12 dB over a range from 27 GHz to 29 GHz.

In some examples, the EBG lattice structure and the DGS may be configured to reduce $S_{11}$ and $S_{22}$ parameters of the MIMO antenna array by about 20 dB to 30 dB over a range from 28.75 GHz to 29.25 GHz.

In some examples, the MIMO antenna array may have a radiation efficiency of between about 82%-84% and an envelope correlation coefficient of about 0.00015.

In some examples, the DGS may be configured to improve an $S_{21}$ parameter of the MIMO antenna array by about 30 dB to 40 dB for at least one frequency between 27 GHz and 29 GHz.

Another aspect of the disclosure is directed to an EBG unit cell structure including: an electrically conductive ground plane; a dielectric substrate formed on a top surface of the electrically conductive ground plane; and a top metal layer formed on a top surface of the second dielectric substrate and including an EBG pattern formed in the top metal layer, wherein the EBG pattern has a 90 degree rotational symmetry and a periodicity between 3-6 millimeters, and the EBG pattern exhibits a frequency bandgap for a range of frequencies at least in part between 8-12 GHz.

In some examples, the EBG pattern may include four corner patches positioned at respective corners of the top metal layer, and a central patch positioned at a center of the top metal layer, and the central patch may be connected to each corner patch by a respective path, and the respective paths may be configured to form a spiral resonator.

In some examples, an irreducible Brillouin zone of the EBG pattern may be a triangular region designated by vertices Γ, X and M.

In some examples, the frequency bandgap may have an FBW of about 50%.

Another aspect of the disclosure is directed to an EBG lattice structure including a plurality of interconnected EBG unit cell structures according to any of the embodiments described herein, wherein an overall inductance of the EBG lattice structure is greater than an individual EBG unit cell structure.

In some examples, a periodicity of the plurality of interconnected EBG unit cell structures may satisfy a periodic boundary condition.

Another aspect of the disclosure is directed to a MIMO antenna array including: a plurality of antennas; and one or more EBG lattice structures according to any of the embodiments described herein, wherein each pair of adjacent antennas is separated by a corresponding EBG lattice structure.

Another aspect of the disclosure is directed to a partially reflective surface (PRS) including: an EBG lattice structure according to any of the embodiments described herein, wherein the EBG lattice structure is positioned over a patch antenna.

In some examples, the EBG lattice structure may be a 7×7 array of EBG unit cell structures.

Another aspect of the disclosure is directed to a frequency selective surface (FSS) including an EBG lattice structure according to any of the embodiments described herein.

In some examples, a resonant frequency of the EBG lattice structure may be consistent for electromagnetic waves of either TE or TM modes of propagation for an angle of incidence up to 60°.

DETAILED DESCRIPTION

Figure 1:
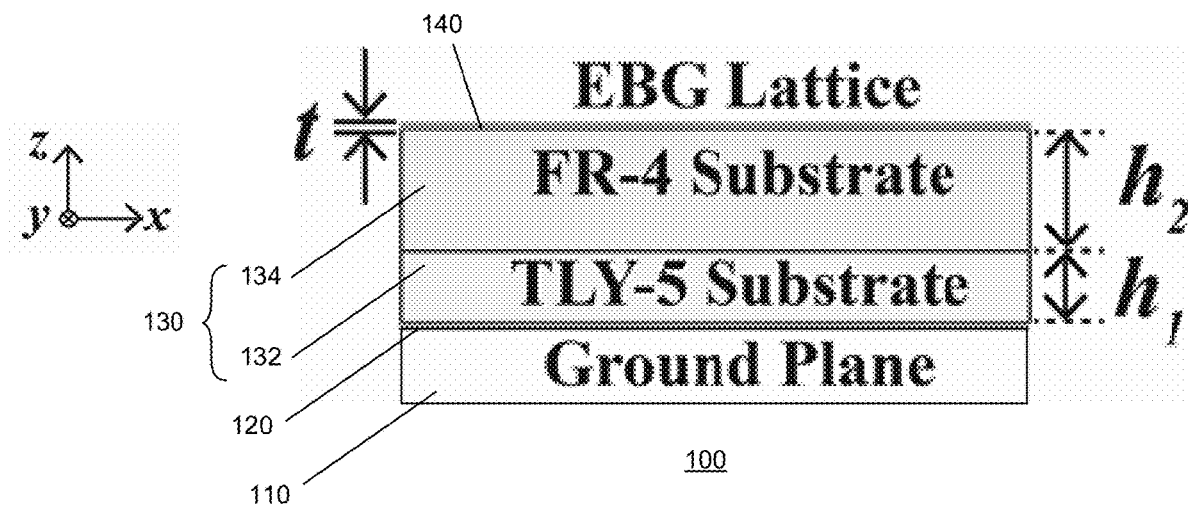
FIG. 1 is a side view schematic of an electronic bandgap (EBG) unit cell structure in accordance with an aspect of the disclosure.

FIG. 1 shows a side view of the structure of a uniplanar EBG unit cell structure 100. The structure includes a substrate 110, a lower metallic layer 120 formed on a top surface of the substrate 110, a composite dielectric substrate 130 formed on a top surface of the lower metallic layer 120, and an upper metallic layer 140 formed on a top surface of the composite dielectric substrate 130 and having a thickness "t." The composite dielectric substrate 130 includes a first substrate 132 having a first relative permittivity $\varepsilon_{r1}$ and a first height $h_1$, and a second substrate 134 formed on a top surface of the first substrate 132 and having a second relative permittivity $\varepsilon_{r2}$ and a second height $h_2$. The first relative permittivity $\varepsilon_{r1}$ may be different from the second relative permittivity $\varepsilon_{r2}$. Additionally or alternatively, the first height $h_1$, may be different from the second height $h_2$. Particularly, the second height may be greater than the first height. An effective dielectric constant of the composite dielectric substrate 130 may be calculated according to the following equation:

$$\sqrt{\varepsilon_{\mathit{eff}}} = \left( \frac{\sqrt{\varepsilon_{r1}} h_1 + \sqrt{\varepsilon_{r2}} h_2}{h} \right) \quad (1)$$

The difference in relative permittivity between the first and second substrates 132, 134 creates a discontinuity that results in reflection of propagating waves. In effect, this causes an additional attenuation of forward propagating waves at the interface between the substrates 132, 134.

In one example of the structure of FIG. 1, the parameters of the structure are: $\varepsilon_{r1}$=2.2 (e.g., relative permittivity of Taconic (TLY-5) material), $h_1$=0.51 mm, $\varepsilon_{r2}$=4.4 (e.g., relative permittivity of Fiber reinforced glass epoxy (FR-4) material), $h_2$=0.8 mm, and t=35 μm. The effective dielectric constant $\varepsilon_{\mathit{eff}}$ of this structure, as calculated according to equation (1) above, is about 3.45. Additionally, the unit cell structure has a total profile height "h" of about 1.31 mm.

Also in the example of the structure of FIG. 1, it can be seen that the upper metallic layer 140 is planar, and does not include metallic vias. This reduces the fabrication complexity of the upper metallic layer 140, as compared to fabrication of mushroom EBG structures.

Figure 2:
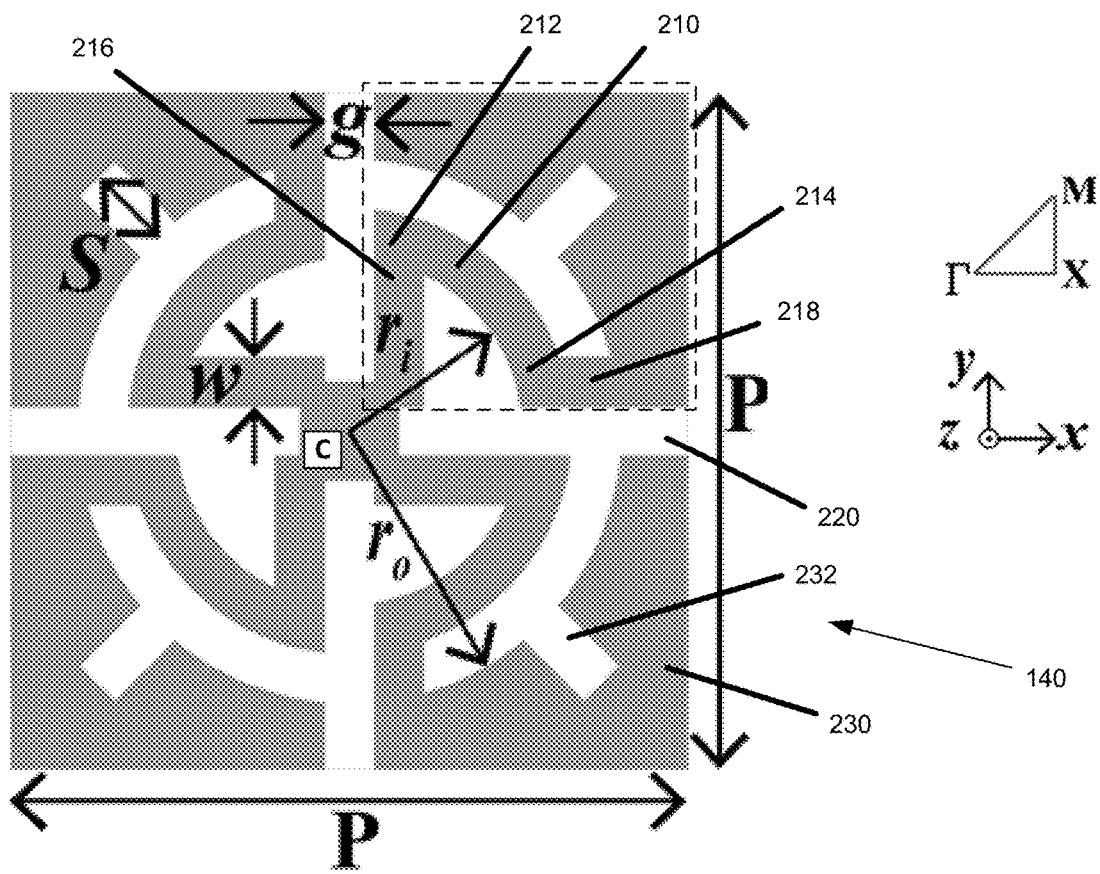
FIG. 2 is a top view schematic of the EBG unit cell structure of FIG. 1.

FIG. 2 shows a top down view of an example uniplanar EBG unit cell structure, such as the structure 100 of FIG. 1. A design 200 of the upper metallic layer 140 of FIG. 1 can be seen more clearly in FIG. 2. The design 200 has a 90 degree rotational symmetry, which allows solving of the eigen frequencies within a triangular irreducible Brillouin zone designated by vertices Γ, X and M. More particularly, the design 200 includes four split sectoral rings. Each sector 210 of the ring is connected at one end 212 to the center (C) of the layer through first metal strips 216 having a radial length $r_i$, and extends outward away from the center (C) from the other end 214 by second metal strips 218. Each of the ring sectors has a width "w," and the gaps 220 separating the ring sectors 210 have a width "g." The width and gap may be configured to respective values based on minimum tolerance during the fabrication of the design 200 in the upper metallic layer 140. In one example of the structure of FIG. 2, each of w and g may be equal to 0.15 mm.

Patches 230 at each corner of the design 200 of the upper metallic layer 140 are a radial distance $r_0$ from the center (C) of the design 200 and are capable of being connected with adjacent unit cells. The patches are coplanar with the rest of the Additionally, a slit 232 extending toward the center (C) of the design 200 is provided at each corner patch 230 to enhance inductance of the unit cell structure 100. The length "S" of the slit 232 may configured to control the center frequency of the bandgap, such as for the center frequency to be at or near to 28 GHz for 5G applications. Periodicity "P" of the design 200, and by extension the EBG unit cell structure 100, may be selected in order to satisfy a periodic boundary condition, so that only a few unit cells are needed to create the effect of an infinite array of cells. The periodicity of the design 200 may be as small as 2.05 mm or $0.35\lambda_g$ in both the length (x) and width (y) directions, where $\lambda_g$ is the guided wavelength inside the composite dielectric substrate at a center frequency of the bandgap of the EBG unit cell structure. $\lambda_g$ is defined by the following equation:

$$\lambda_g = \frac{\lambda_0}{\sqrt{\varepsilon_{\mathit{eff}}}}. \tag{2}$$

in which $\lambda_0$ is the wavelength of the propagating waves. In the example of FIG. 2, the 2.05 mm periodicity of the design 200 is equal to $0.191\lambda_0$, which is less than the approximately 10 mm length corresponding to $\lambda_0$, although in other examples, a periodicity of between 2-10 mm may be used. Also, perfect match layers of the electric and magnetic fields ($E_r=0/H_r=0$) are enforced along the z-axis of the unit cell structure, which is orthogonal to the direction of propagating waves.

The design 200 has a relatively simple geometry, which can be defined using only a few parameters, particularly $r_1$, $r_0$, q, w, S, and P. Simplification of the geometry is advantageous in that it permits for optimization of the structure to be achieved more easily since there are fewer parameters to control. Additionally, having fewer parameters means that frequency scalability is also simpler, making it is easier to scale down the structure for high frequency applications. In one example arrangement, the following parameters were selected: $r_1=0.525$ mm, $r_o=0.825$ mm, q=0.15 mm, w=0.15 mm, s=0.26 mm, P=2.05 mm, although in other arrangements, different parameters may be chosen according to simulation techniques, such as a full wave simulator.

Figure 3:
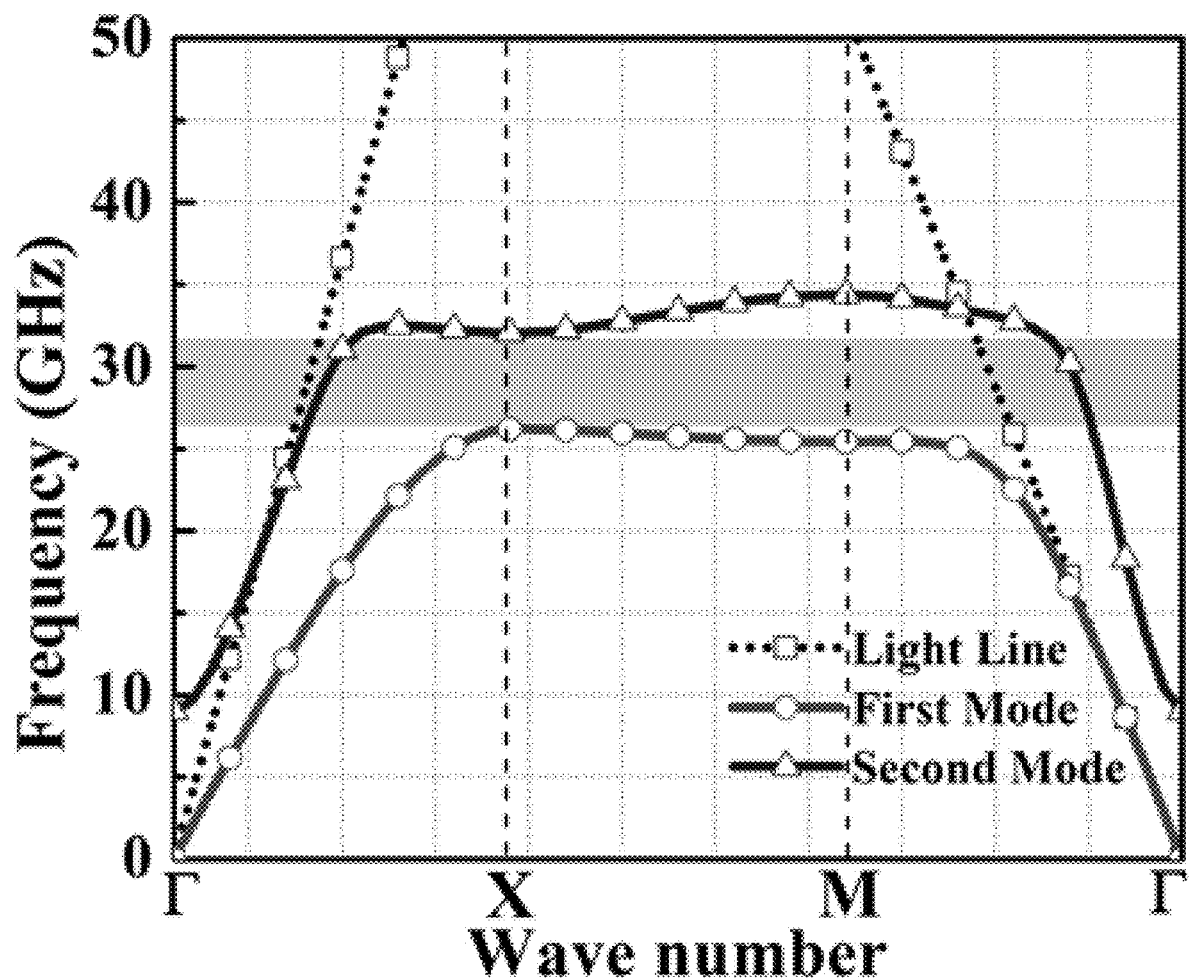
FIG. 3 is a Brillouin dispersion diagram showing dispersion characteristics of the EBG unit cell structure of FIG. 1.

FIG. 3 is a Brillouin dispersion diagram showing dispersion characteristics of the EBG unit cell structure 100 over the irreducible Brillouin zone of the structure. As noted herein, the irreducible Brillouin zone is a triangular region designated by the vertices Γ, X and M. The dispersion characteristics of the structure can be numerically simulated using an eigenmode solver, such as finite element eigenmode (FEEM) solver, with periodic boundary conditions to mimic a two-dimensional plane. The eigenmode solver may be included in a full wave simulator for simulating electromagnetic properties of the unit cell structure. The diagram of FIG. 3 confirms the presence of a frequency bandgap between the first and second modes for the parameters of the EBG unit cell structure 100 of FIG. 1. Furthermore, the diagram shows that the frequency bandgap that extends beyond 27-29 GHz, and particularly from 26.2-32.03 GHz, which corresponds to a fractional bandwidth (FBW) of between 15-25% (in the example of FIG. 3, the FBW is 20.02%). Having a bandwidth in the 28 GHz range is particularly advantageous for millimeter wave operations, and the high fractional bandwidth makes the EBG unit cell structure suitable.

Figure 4:
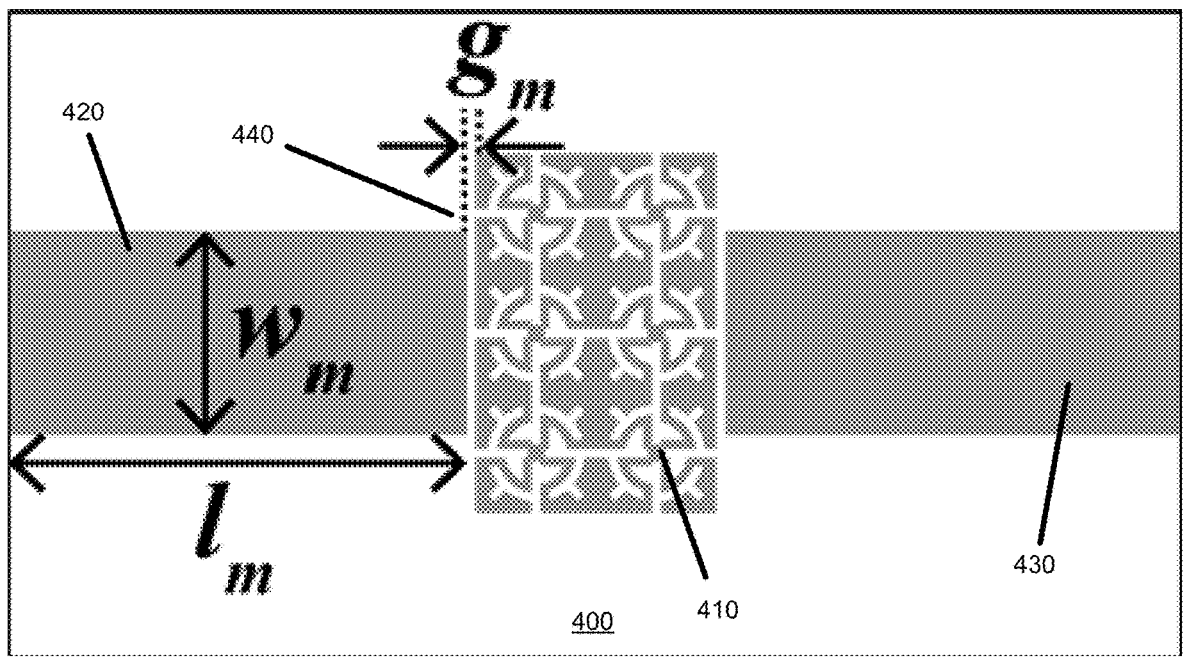
FIG. 4 is a top view schematic of an EBG lattice structure in accordance with an aspect of the disclosure.

FIG. 4 shows a top down view of an example EBG lattice structure 400 including a plurality of EBG unit cell structures 410 arranged in an M×N lattice between first and second open end transmission lines 420, 430. In the example of FIG. 4, the M×N lattice is a 3×2 lattice. Each unit cell structure of the plurality 410 shown in FIG. 4 is designed according to the design 200 shown in FIG. 2, although other designs may be used and parameters may be adjusted in order to meet specific needs of a given application. Each transmission line 420, 430 has a length $l_m$ and a width $w_m$. Additionally, each transmission line 420, 430, is separated from the EBG lattice structure 410 by a gap 440 having a gap width $g_m$. In one example arrangement, the following parameters were selected: $l_m=7.8$ mm, $w_m=3.5$ mm, $g_m=0.15$ mm, although in other arrangements, different parameters may be chosen according to simulation techniques, such as a full wave simulator.

Figure 5:
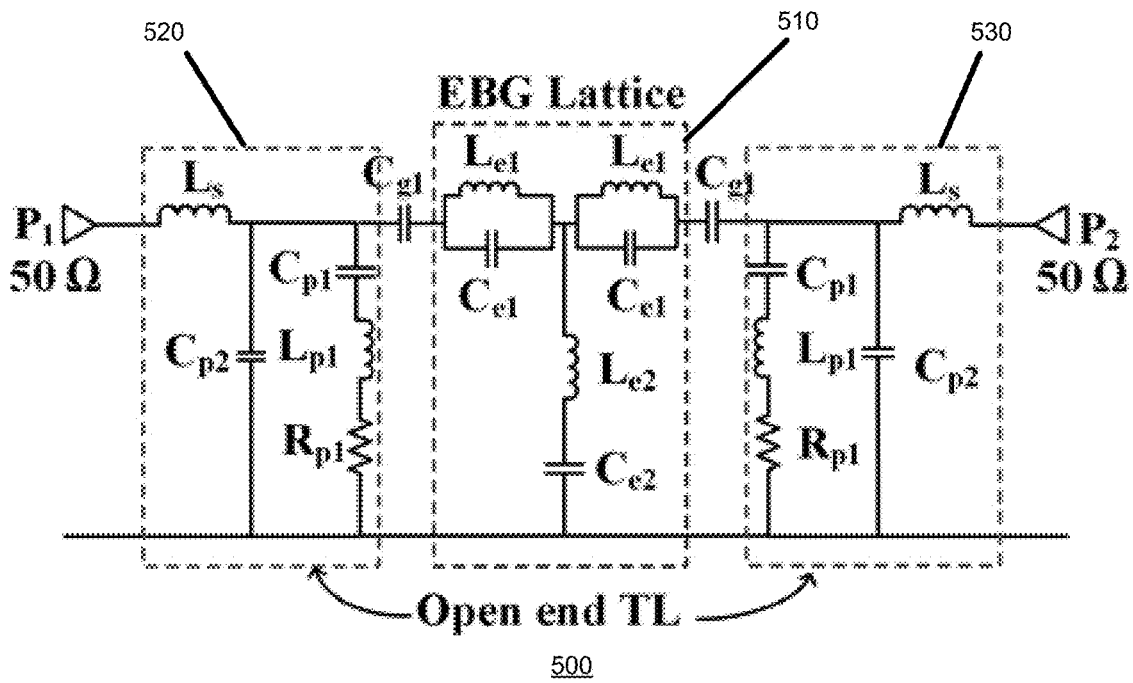
FIG. 5 is circuit diagram showing an equivalent circuit of the EBG lattice structure of FIG. 4.

FIG. 5 is a circuit diagram showing an equivalent circuit 500 of the example EBG lattice structure 400 of FIG. 4. The structure is modeled as an EBG lattice 510 positioned between a first open end transmission line 520 and a second open end transmission line 530. As seen from both FIGS. 4 and 5, the transmission lines 520, 530 are symmetrical with one another, and the EBG lattice structure 510 is symmetrical with itself.

The EBG lattice structure 510 is modeled as a parallel LC tank circuit having a bandwidth that is equal to $$\frac{1}{z}\sqrt{\frac{L}{C}},$$

in which z is the wave impedance and L and C represent the inductance and capacitance of the modeled tank circuit, respectively. The bandwidth of the structure is a width of the bandgap between the first two propagating modes in the modeled dispersion characteristics.

The EBG lattice structure is configured as a T-network including serially connected branch components and a shunt component positioned between the branch components. Each branch component is modeled as a parallel resonant circuit having an inductance $L_{e1}$ and capacitance $C_{e1}$. The shunt component is modeled as series resonant circuit having an inductance $L_{e2}$ and a capacitance $C_{e2}$. Interconnection of each unit cell's ring sectors at the center results in a long surface current path over a surface of the unit cell. Additionally, interconnection of the EBG unit cells with one another further increases the current path of the EBG lattice structure as compared to an individual EBG unit cell, which further increases the length of the current path. The increase in current path leads to an increase the inductance $L_{e1}$ of the structure, which in turn increases the bandwidth of the tank LC circuit. The overlapping area between the top metallic layer 140 and lower metallic layer 120 accounts for the capacitance $C_{e1}$. $C_{g1}$ is an additional capacitance contributed by the gap 440 shown in FIG. 4. The fringing effect at the edges of the metallic layers 120, 140 further contribute to the overall capacitance, which may also be thought of as an increase in the effective overlapping area of the metallic layers 120, 140. The reduction in capacitance due to the multilayer configuration and increase in inductance due to cell interconnection has a greater effect on the bandwidth of the structure than the increase in capacitance due to the fringing effect and gap. Therefore, since bandwidth is equal to $$\frac{1}{z}\sqrt{\frac{L}{C}},$$

the lattice structure results in an overall increase in bandwidth.

Each of the open ended transmission lines 520, 530 has an impedance of about 50Ω ($P_1$, $P_2$). The transmission lines 520, 530 act as launcher and receptor, respectively, of propagating electromagnetic waves at the operating wavelength. The transmission lines 520, 530 are modeled in FIG. 5 as a series inductor $L_s$ coupled with a shunt capacitor $C_{p2}$. An additional shunt series RLC resonant circuit having values of $R_{p1}$, $L_{p1}$ and $C_{p1}$ is included in FIG. 5 to represent radiation losses due to the aforementioned fringing effect at the edges of the metallic layers next to the transmission lines.

The transmission lines 420, 430 are provided in order to load the unit cell structures 410 in order to improve isolation characteristics of the EBG lattice structure 400. For instance, at 27.5 GHz, coupling the EBG lattice structure with the above-specified parameters between two H-plane coupled patch antennas can result in an isolation improvement of up to 23.37 dB, as compared to an unloaded EBG lattice structure.

Figure 6:
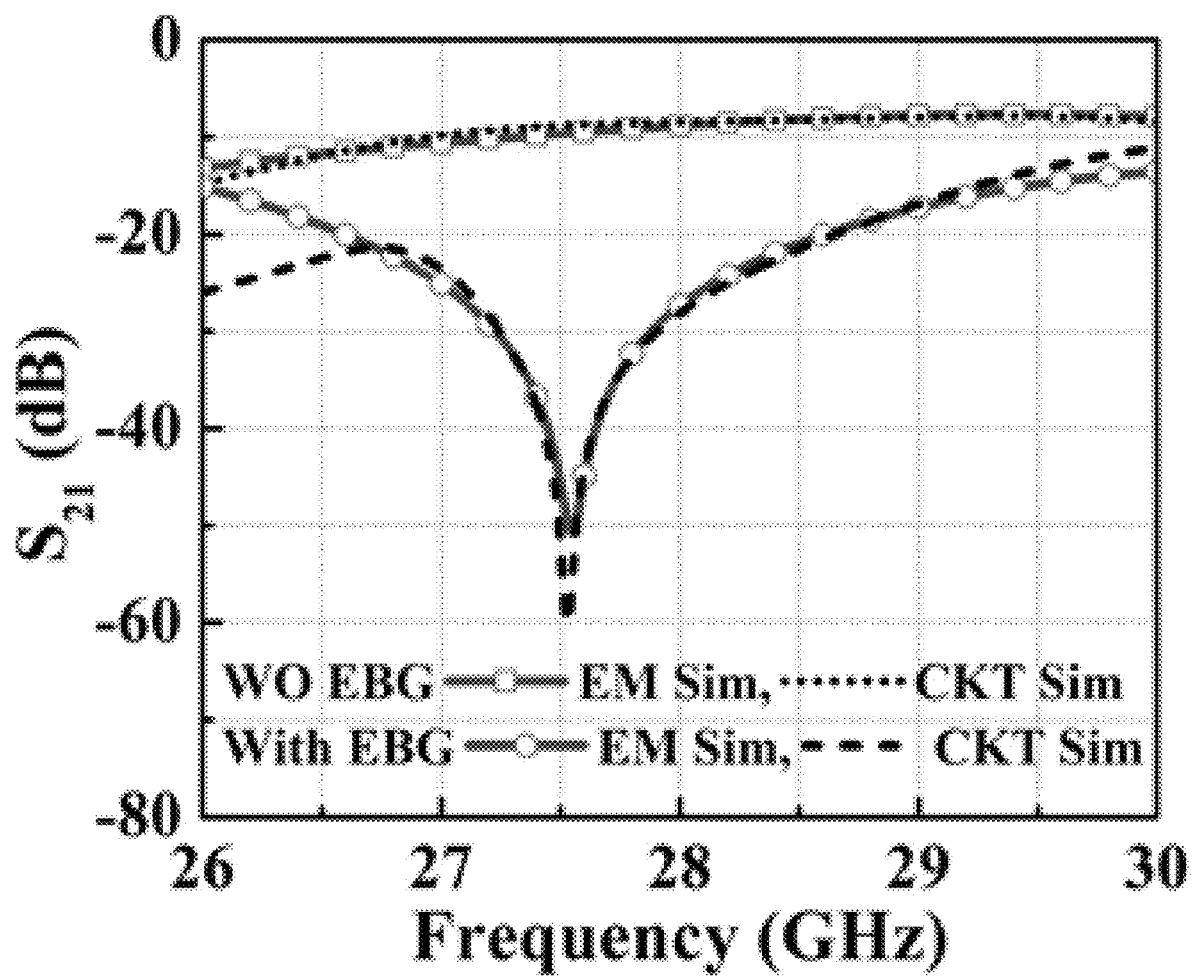
FIG. 6 is a graph showing simulated S-parameters of the EBG lattice structure of FIG. 4.

FIG. 6 shows simulations of the equivalent circuit shown in FIG. 5 and of an unloaded EBG lattice structure and the EBG lattice structure with the transmission lines. The simulations were performed using both an electromagnetic simulator and a circuit simulator. For the simulations, 27.5 GHz was chosen as a center frequency. As shown in FIG. 6, the loaded transmission lines create a transmission zero near the center of the bandgap. Thus, loading the transmission lines reduces coupling between antennas by at least 10 dB over a range from 27 GHz to 29 GHz, and by as much as 50 dB according to the equivalent circuit simulation (40 dB according to the EM simulation) at the center frequency. These results confirm that the EBG lattice structure is capable of functioning as a surface wave suppression unit.

Aspects of the EBG lattice structures of the present disclosure, such as the EBG lattice structure 400 of FIG. 4 described above, can be incorporated in a MIMO antenna array in order to decouple channels of the array at within a millimeter wavelength band. The MIMO antenna array may include an array of proximity-coupled microstrip antennas, as is found in 5G cellular applications. Proximity coupling is an electromagnetic coupling technique to achieve broadband impedance matching for the antenna element over a wide frequency range. The EBG lattice structure may be positioned between two microstrip antennas in order to reduce unwanted coupling effects between the antennas, thus permitting for better utilization of the millimeter wave operating frequency range, smaller antenna arrays, or a combination thereof.

Figure 7A:
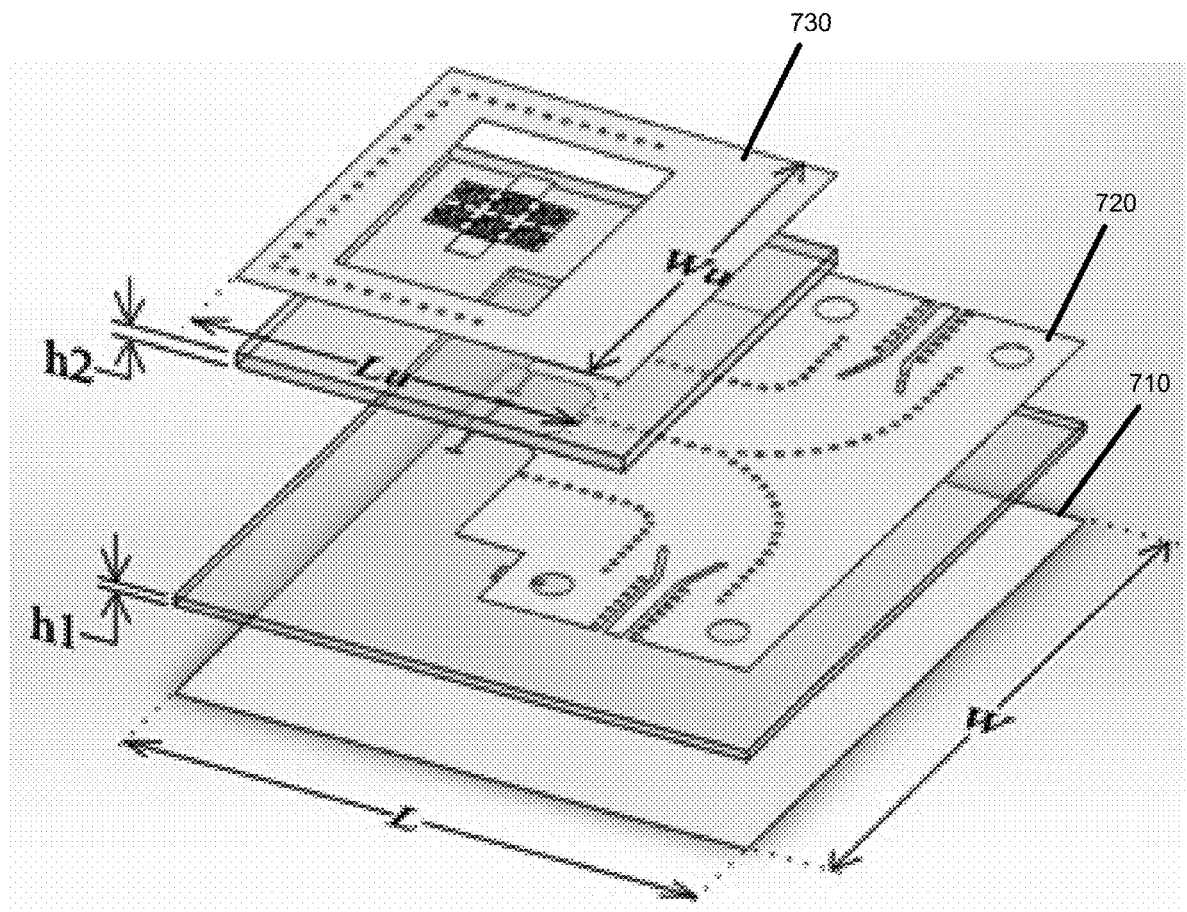
FIG. 7A is an exploded perspective view schematic of a multiple-input multiple output (MIMO) antenna array loaded with an EBG lattice structure and a defected ground structure (DGS) in accordance with an aspect of the disclosure.

FIG. 7A is a perspective view of such an example antenna array 700. The antenna array 700 includes three metal planes: a ground metal plane 710, a second metal plane 720 above the ground metal plane 710, and a third metal plane 730 above the second metal plane 720. The ground metal plane 710 is separated from the second metal plane 720 by a first dielectric substrate 750 having a first thickness $h_1$, and the second metal plane 720 is separated from the third metal plane 730 by a second dielectric substrate 760 having a second thickness $h_2$. The second dielectric substrate 760 may have a different relative permittivity than the first dielectric substrate 750, may be relatively thicker than the first dielectric substrate 750, or both. Features of each of the ground plane 710, second plane 720 and third plane 730 shown in FIGS. 7B, 7C and 7D, respectively, and described in greater detail in connection with those figures. Parameters of the antenna array 700 layers may be the same as shown in FIG. 1, whereby the first dielectric substrate 750 may be a TLY-5 substrate with a height $h_1$ of 0.51 mm and a relative permittivity $\varepsilon_{r1}$ of 2.2 and the second dielectric substrate 760 may be an FR-4 substrate with a height $h_2$ of 0.8 mm and a permittivity $\varepsilon_{r2}$ of 4.4.

Figure 7B:
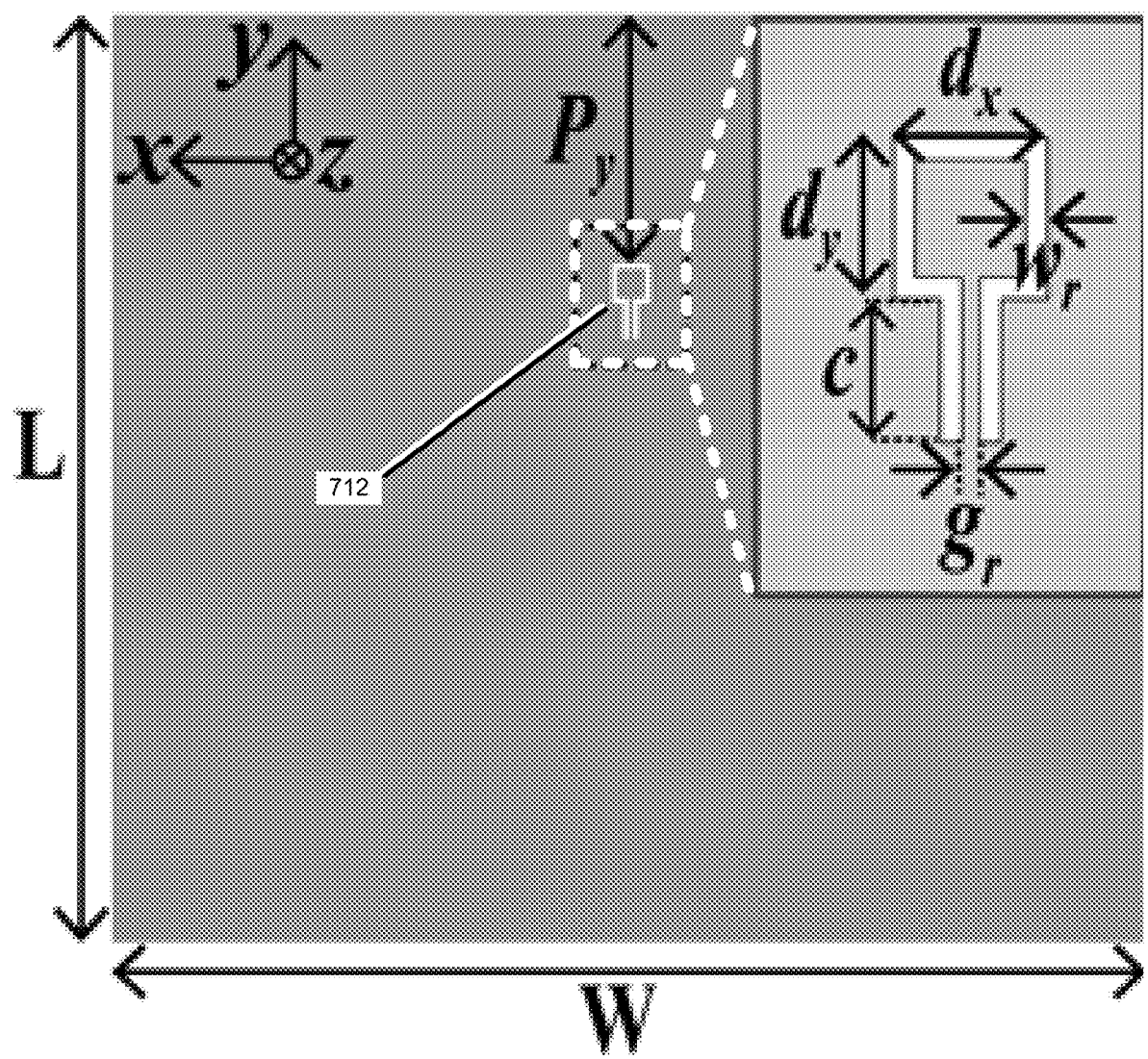
FIGS. 7B-7D are top view schematics of first, second and third planes of the MIMO antenna array of FIG. 7A.

In FIG. 7B, the ground plane 710 is shown to include a defected ground structure (DGS) 712. In the example of FIG. 7B, the DGS 712 is hairpin-shaped, and has a sub-wavelength effective slot length. For instance, for an operating frequency of 28 GHz, the effective slot length of the DGS 712 is less than 10.7 mm. In the example of FIG. 7B, the effective slot length is 6.81, or about 63% of the signal wavelength $\lambda_0$.

Figure 7C:
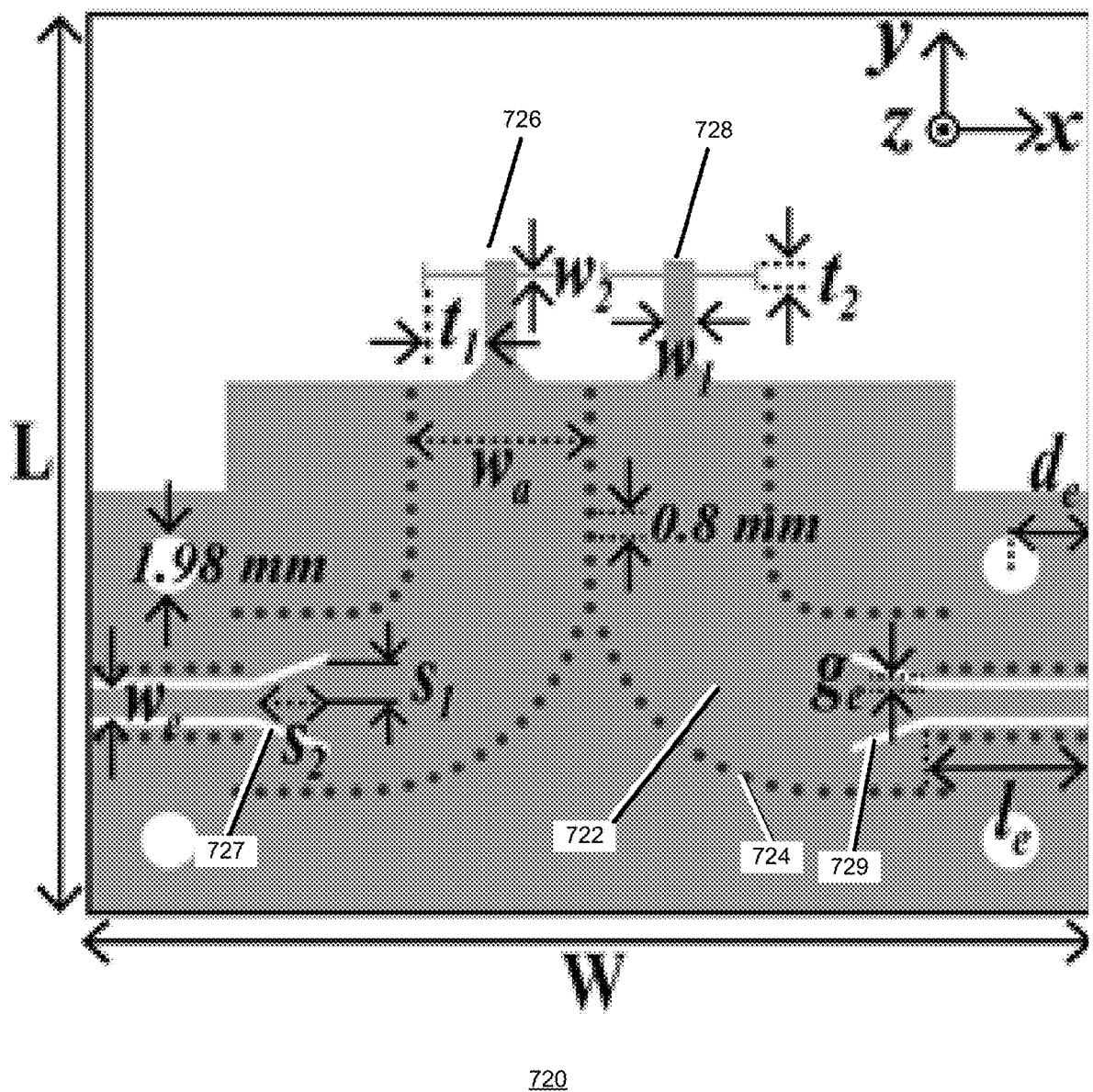

In FIG. 7C, the second plane 720 is shown to include two substrate-integrated waveguides (SIW) 721, 722. Each SIW 721, 722 may be a printed laminated waveguide. Metal vias 724 are evenly spaced in two rows in order to form the sidewalls of the waveguides 721, 722. The spacing or pitch of the vias 724 is selected to be less than double the diameter of the vias 724, in order that the vias 724 are effective at reducing radiation/leakage losses. The waveguide 722 is configured to form a cavity that confines propagation of surface waves from the antenna elements. In the example of FIG. 7C, the SIWs 721, 722 share a common wall 725 in between the input and output of the waveguide. A pair of microstrip feed lines 726, 728 are positioned at ends of the respective SIWs 721, 722. In the example of FIG. 7C, each microstrip feed line 726, 728 is T-shaped stub having a mirror symmetry. The T-shaped stub provides for 50Ω impedance matching, although other structures may be provided to achieve different or similar impedance matching. This results in a unidirectional radiation pattern with a high FTBR so that gain of the antenna can be maximized over its operating range. This is accomplished all while maintaining sub-wavelength spacing between the two antenna elements, thus making the design practical for millimeter wave frequency applications such as 5G-compatible devices. In particular, the spacing of the respective microstrip feed lines 726, 728 to the antenna elements is only about 6.21 mm, or 58% of the operating signal wavelength $\lambda_0$ (10.7 mm, corresponding to a center frequency of 28 GHz).

A discontinuity in the lengthwise direction of the waveguide 722 limits the mode of propagation inside the waveguide to $TE_{m0}$. More particularly, in the example SIW arrangement of FIG. 7C, of the discontinuity created by the metal vias of the SIW (which suppress propagation of longitudinal current) results in only $TE_{m0}$ mode (for which m≠0) waves being passed, and both $TM_{mn}$ and $TE_{mn}$ modes (for which m≠0 and n≠0) being suppressed.

The SIW cavity is configured to embrace the antenna elements 732, 734 such that the antenna elements 732, 734 are positioned within the respective SIW cavities and the top metal wall forms an outer periphery of the SIW cavity. This allows the propagation of surface waves to be confined to within a space within the walls of the respective SIW cavities. This configuration also ensures that the radiation patterns of the antenna array are not affected by incorporation of the EBG. In the example of FIG. 7, the waveguides 721, 722 are curved with a 90 degree bend in order to facilitate easier connection to the respective antenna elements 732, 734 through the feed lines 726, 728, such as by attaching end launch connectors to the respective ports opposite ends of the plane 720. The waveguides also exhibit lower losses due to reduced reflection from the presence of the curves. This, in turn, helps to achieve better impedance matching of the antenna elements 732, 734.

The second plane includes a transition between each SIW to corresponding microstrips 727, 729. The transition points are positioned close to the antenna feeds. Overall, presence of the SIWs helps to reduce radiation losses from the antenna feeds while also contributing to isolation between the ports.

Figure 7D:
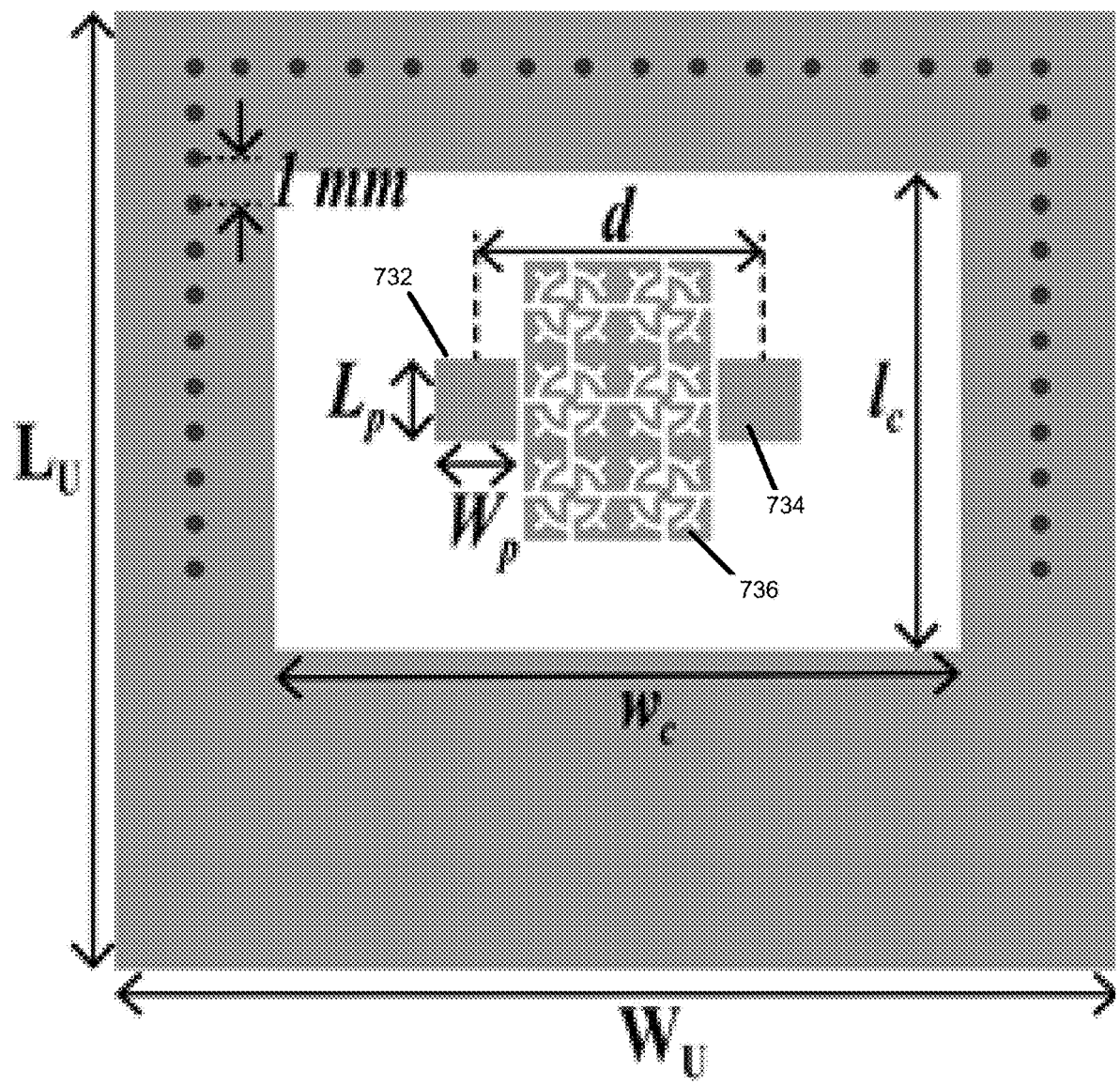

In FIG. 7D, the third plane is shown to include first and second H-plane radiating antenna elements 732, 734 and an EBG lattice structure 736 positioned in between each of the radiating antenna elements 732, 734. In the example of FIG. 7D, each radiating antenna element 732, 734 is a patch. Each radiating antenna element 732, 734 is positioned over a respective portion of the SIW 722 formed in the second plane 720. The EBG lattice structure 736 may be the same as the EBG lattice structure 400 described in connection to FIG. 4. For instance, in FIG. 7, the EBG lattice structure is shown as a 3×2 lattice. The EBG lattice structure 736 provides isolation between the radiating antenna elements 732, 734. For instance, 23.37 dB of isolation may be achieved at an operation frequency of 27.5 GHz, and an average isolation improvement of 12.1 dB may be achieved over the entire operating range. At this frequency, coupling between the antenna elements of the MIMO antenna array is −41.06 dB.

The DGS 712 formed in the first plane 710 is positioned directly underneath the EBG lattice structure 736, and further enhances the isolation characteristics between the radiating antenna elements 732, 734.

In one example arrangement of the antenna array of FIGS. 7A-D, the following parameters were selected: L=31.1 mm, W=34.7 mm, $L_u$=21 mm, $W_u$=22 mm, Py=8.325 mm, $d_x$=1.29 mm, $d_y$=1.35 mm, $w_r$=0.18 mm, C=1.2 mm, $g_r$=0.15 mm, $l_c$=10.48 mm, $w_c$=15 mm $d_r$=6.2 mm, $L_p$=1.8 mm, $W_p$=1.8 mm, $d_e$=2.79 mm, $l_e$=5.75 mm, $g_e$=0.35 mm, $S_1$=1.42 mm, $S_2$=2.56 mm, $w_a$=6.2 mm, $t_1$=2.02 mm, $t_2$=0.85 mm, $w_1$=1.1 mm, and $w_2$=0.19 mm, although in other arrangements, different parameters may be chosen according to simulation techniques, such as a full wave simulator. Also, the example antenna array of FIGS. 7A-D includes two antennas. However, in other antenna array arrangements, additional antennas may be included using the same or similar principles. For instance, an SIW corporate-feed network may be implemented with the SIWs in order to feed waves to the additional antenna elements through feeding branches of the corporate-feed network. In such an arrangement, the additional antenna elements may be patch antennas, comparable to those shown in FIG. 7D.

Figure 8A:
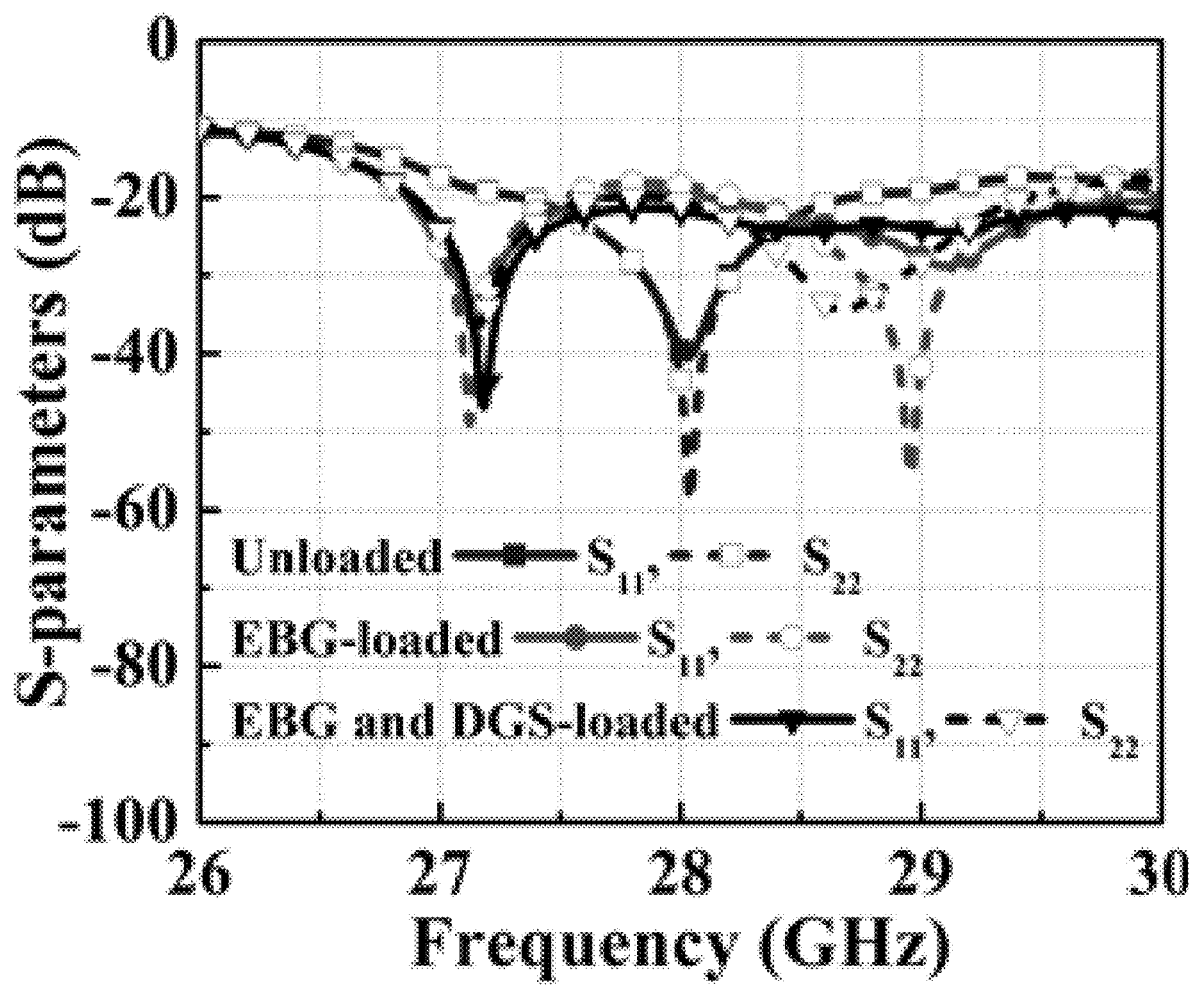
FIGS. 8A-B are graphs illustrating simulated S-parameters for each of a standard MIMO antenna array, a MIMO antenna array including the EBG lattice structure, and a MIMO antenna array including an EBG lattice structure and DGS.

FIG. 8A is a graph illustrating simulated impedance matching characteristics ($S_{11}$, $S_{22}$) for each of a standard MIMO antenna array, a MIMO antenna array including the above described EBG lattice structure, and a MIMO antenna array including both the EBG lattice structure and DGS, as a function of frequency. As shown in FIG. 8A, return loss at a first port of the antenna array ($S_{11}$) is about −40 dB and at a second port of the antenna array ($S_{22}$) is about −58 dB at 27.94 GHz in the standard MIMO antenna array. By contrast, in the MIMO antenna array including the EBG lattice structure, the return loss at both the first and second ports is reduced to about −20 dB at 27.94 GHz. Furthermore, in the MIMO antenna array including the EBG lattice structure and DGS, mutual coupling is reduced to about −47.72 dB at 27.94 GHz. An overall reduction in return loss can also be seen in FIG. 8A for frequencies 28.75-29.25 GHz when the DGS is added to the EBG lattice structure.

Figure 8B:
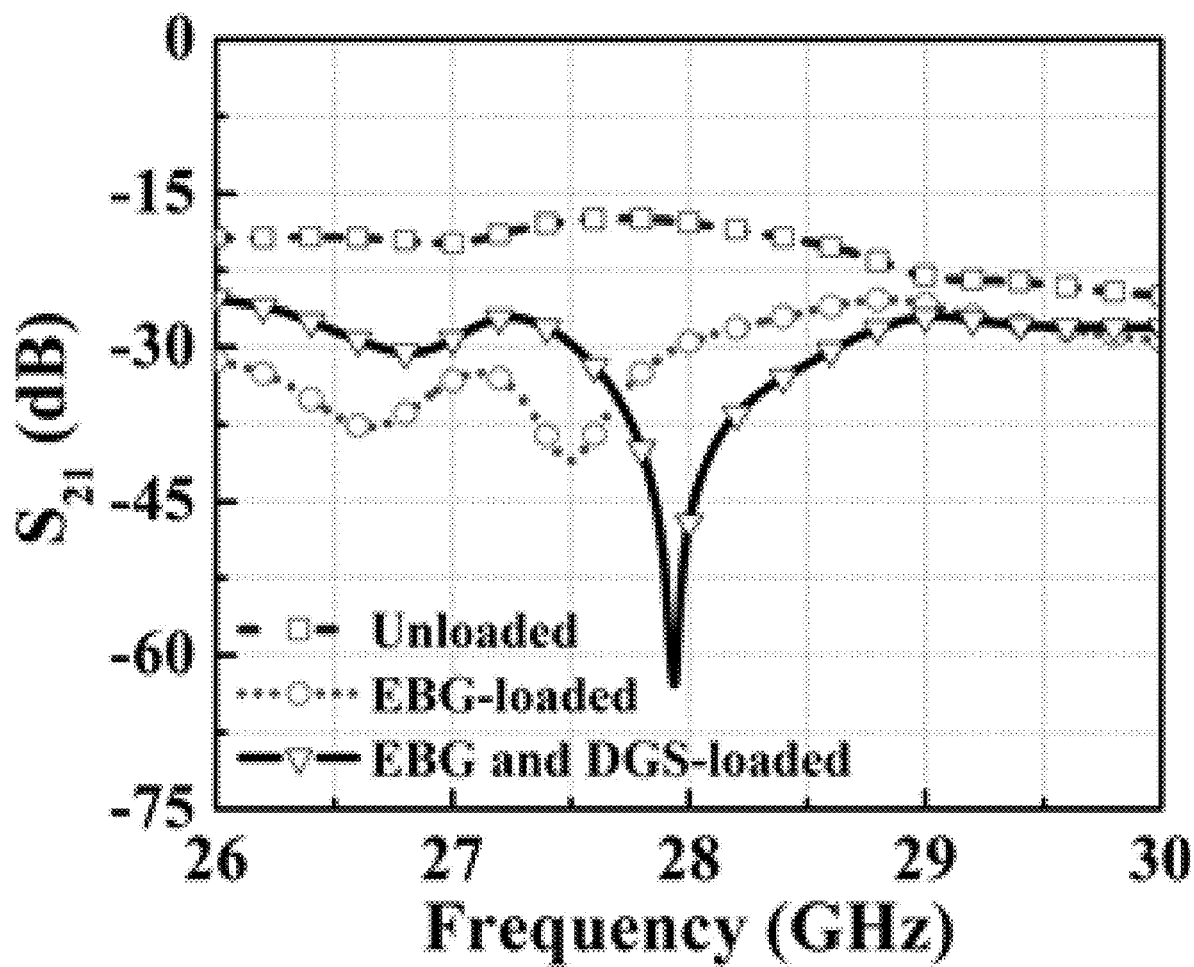

FIG. 8B is a graph illustrating simulated isolation characteristics ($S_{21}$) for each of the same antenna arrays. As shown in FIG. 8B, insertion loss between the first and second ports of the standard MIMO antenna array ($S_{21}$) is no lower than −25 dB between 26 GHz and 29.5 GHz. Insertion loss is improved when an EBG lattice structure is added to the antenna array, and is reduced to as low as about −40 dB at 27.5 GHz. Insertion is even further improved by inclusion of a DGS, and is reduced to as low as about −63 dB at 27.94 GHz. This results in an overall isolation between antennas of the MIMO antenna array is improved by 35.23 dB at the operating frequency of 27.94 GHz when a DGS and EBG lattice array are included, as compared to the standard antenna array.

Figure 9:
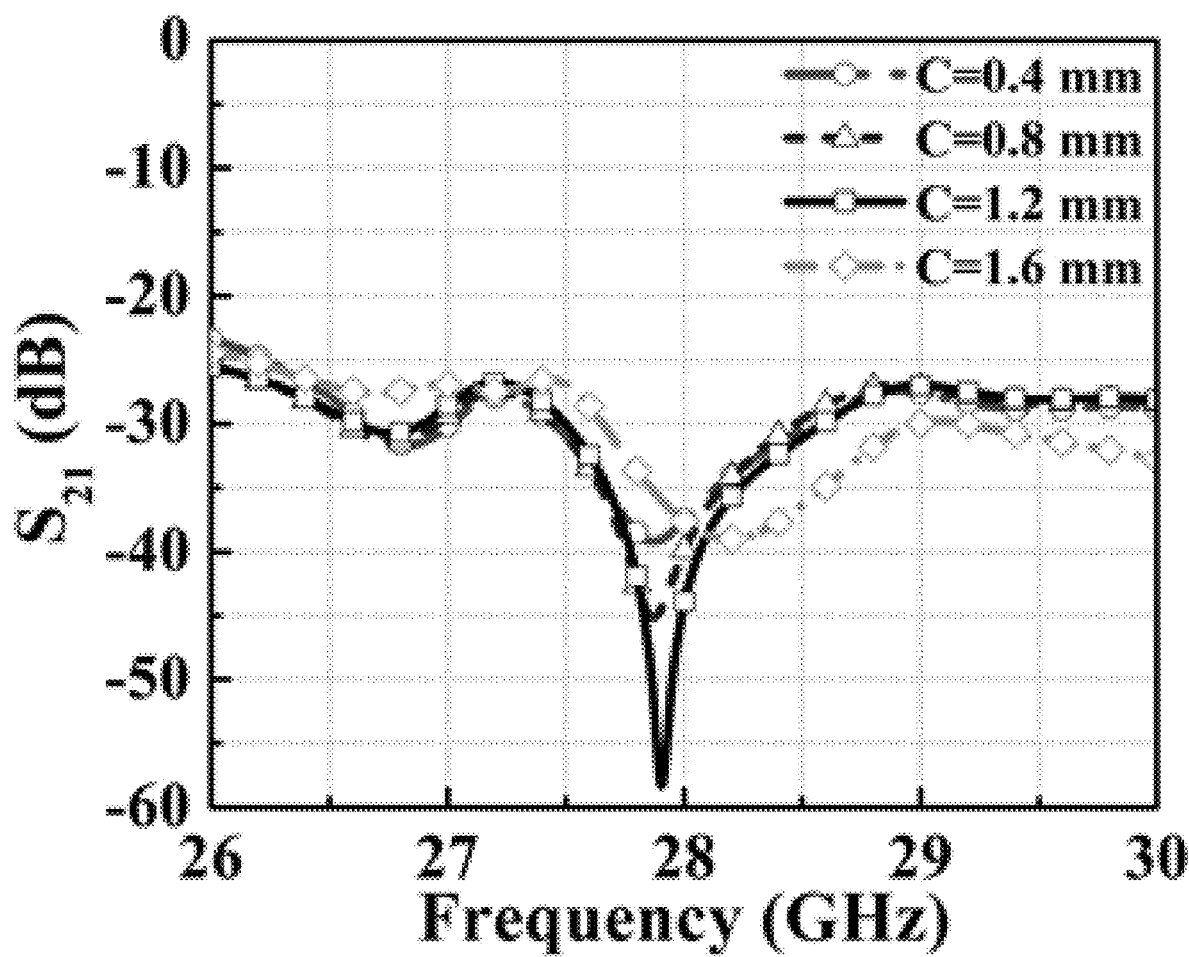
FIG. 9 is a graph illustrating simulated isolation characteristics of antenna arrays of differing DGS lengths.

The amount of isolation between the ports of the antenna array can further be improved by optimizing a length of the DGS in the direction of the DGS slot in order to optimize capacitive coupling between the DGS and the EBG lattice structure. FIG. 9 is a graph illustrating simulated isolation characteristics of antenna arrays including an EBG lattice structure and DGS as a function of frequency. The arrays plotted in the graph differ by the length of the DGS in the longitudinal direction of the DGS slot, also referred to as the provided underneath the EBG lattice structure. As can be seen from FIG. 9, the antenna array with a DGS having a vertical length of 1.2 mm has better isolation characteristics (about −58 dB at 27.94 GHz) compared to antenna arrays having a DGS with different vertical lengths, such as 0.4 mm (about −39 dB at 27.94 GHz), 0.8 mm (about −45 dB at 27.94 GHz) and 1.6 mm (about −40 dB at 28.2 GHz).

Figure 10A:
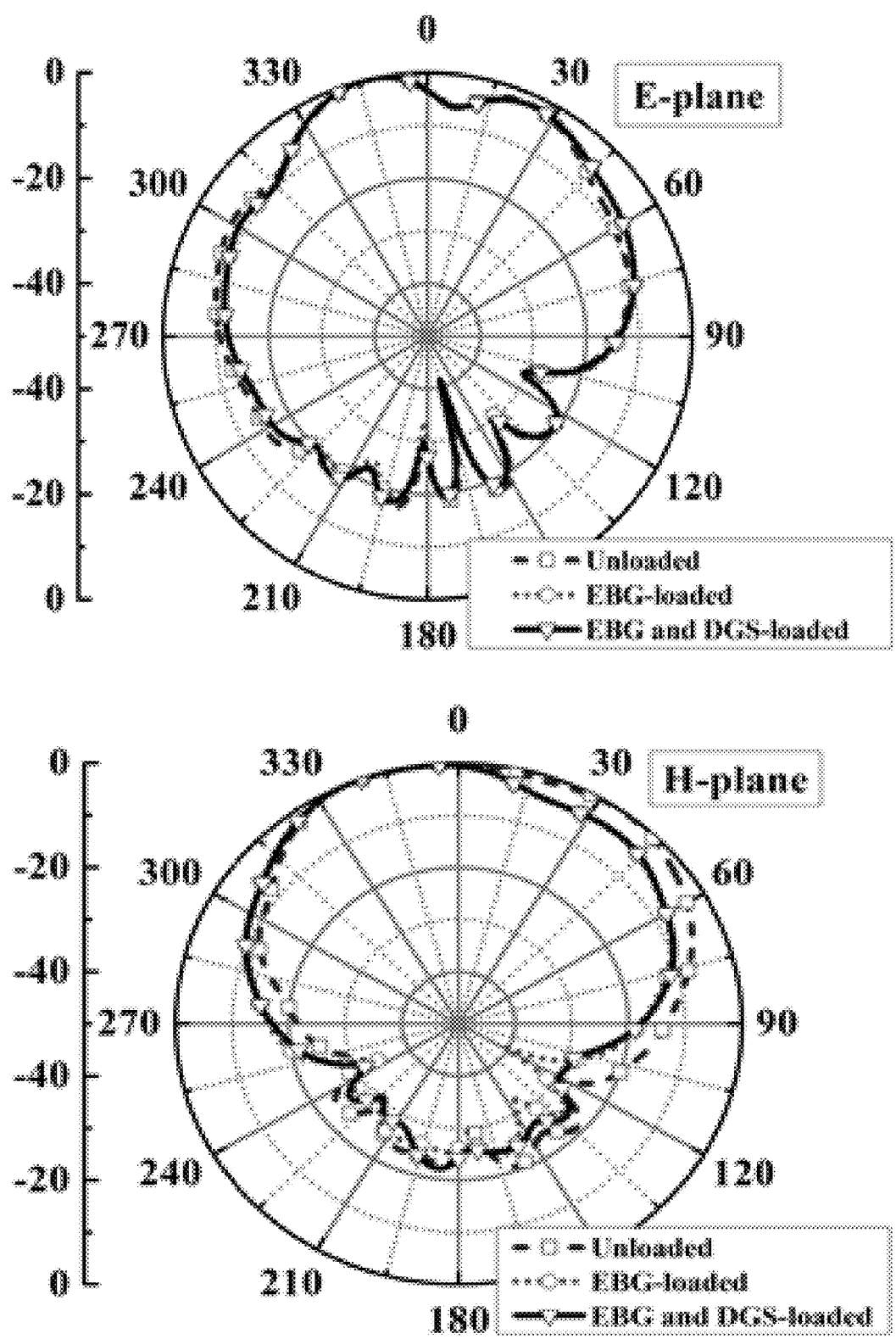
FIGS. 10A-C are graphs illustrating simulated radiation patterns in both the E-plane and the H-plane for a MIMO antenna array.
Figure 10B:
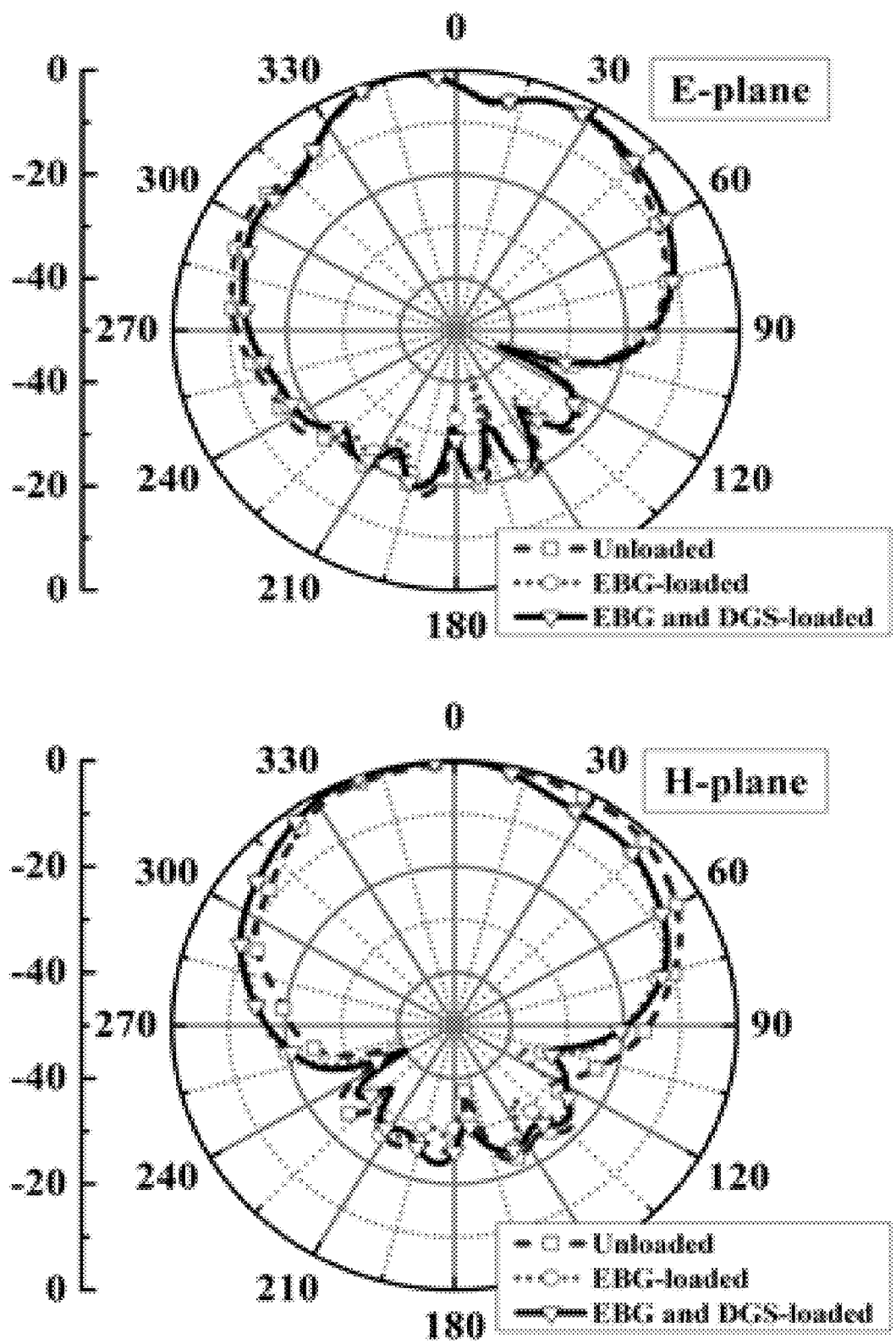
Figure 10C:
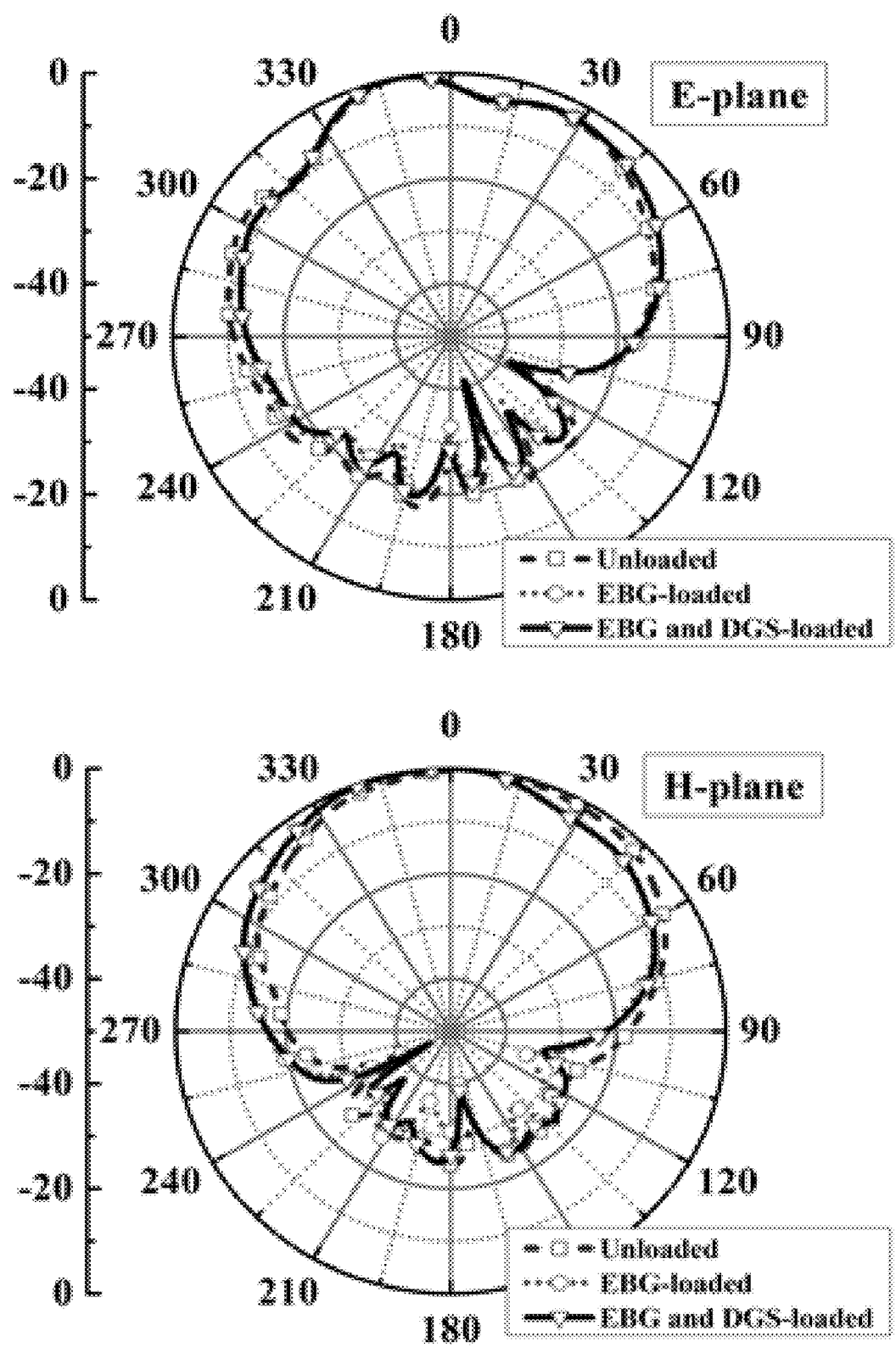

As can be seen in FIG. 9, isolation of the antenna array ports can be achieved using a sub-wavelength DGS, such as a DGS having a vertical length of 1.2 mm. Using a sub-wavelength DGS is also advantageous for maintaining a good front-to-back ratio (FTBR) of the antenna radiation. FIGS. 10A-10C are graphs illustrating simulated radiation patterns in both the E-plane and the H-plane for a MIMO antenna array operated at different operating frequencies. FIG. 10A shows the radiation pattern at 27.75 GHz, FIG. 10B shows the radiation pattern at 28 GHz, and FIG. 10C shows the radiation pattern at 28.25 GHz. As can be seen from the Figures, using a sub-wavelength size DGS allows for suppression of mutual coupling between patches of the EBG lattice structure without any significant change to the FTBR of the antenna radiation pattern. Specifically, the figures show FTBR to be about 26.1 dB over the operating frequency range.

FIGS. 8A-8B, 9, and 10A-10C illustrate properties of the above-described antenna array according to simulations conducted. To check the simulated properties, a prototype of the EBG and DGS loaded MIMO antenna array was fabricated using standard printed circuit board (PCB) fabrication techniques. The same properties were measured in the fabricated prototype over the operating range of 27.75 GHz-28.25 GHz.

Figure 11A:
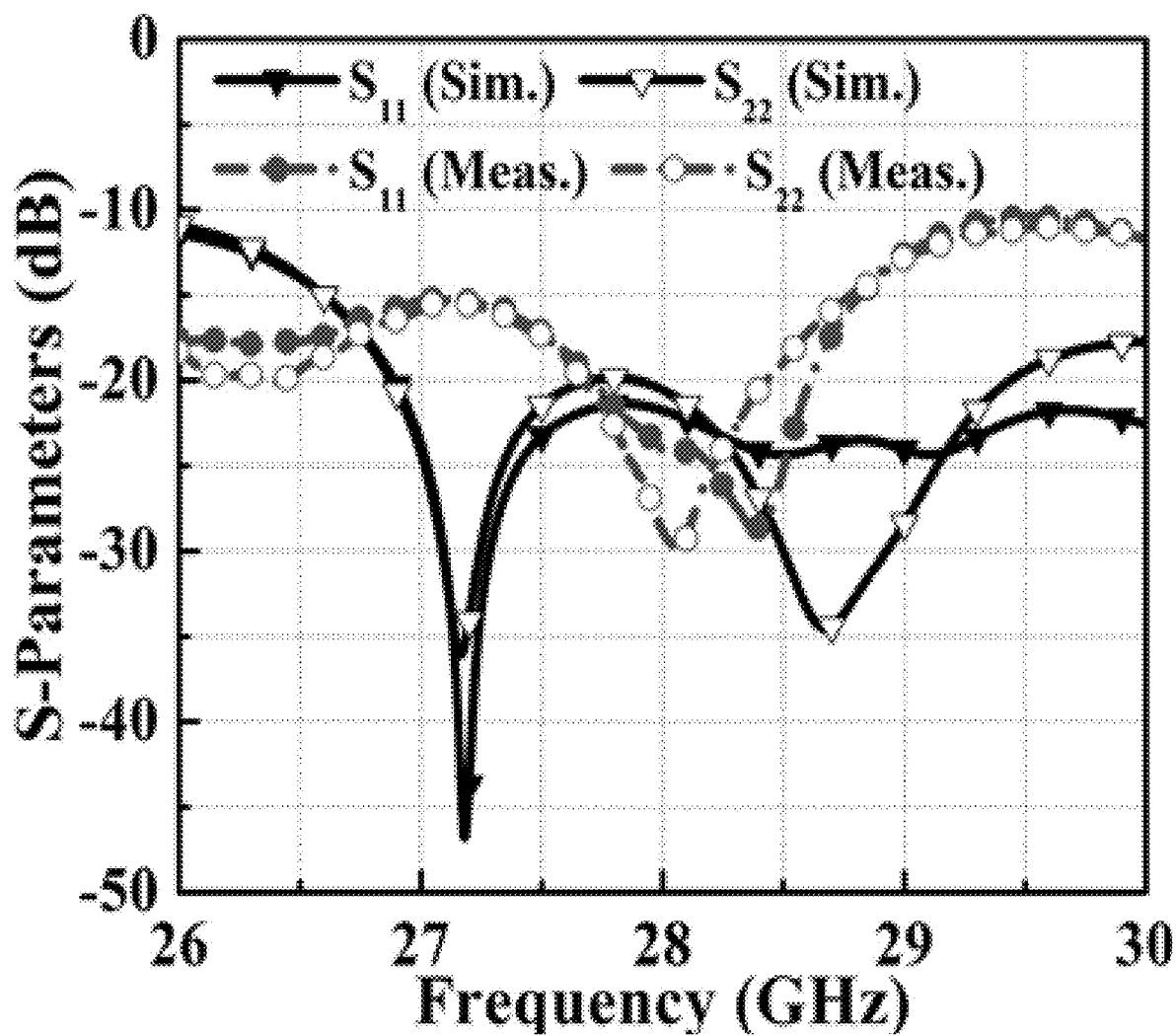
FIGS. 11A-B are graphs illustrating measured S-parameters for a prototype antenna array in accordance with an aspect of the disclosure.

FIG. 11A is a graph illustrating measured impedance matching characteristics ($S_{11}$, $S_{22}$) for the prototype antenna array as a function of frequency. FIG. 11A also illustrates the simulated characteristics from FIG. 8A for the sake of comparison. The measurements confirm that return loss at both ports of the antenna array ($S_{11}$, $S_{22}$) is only −20.57 dB or better over the entire operating frequency range. Thus, the combined EBG and DGS play the role of reducing return loss, while a wideband impedance matching for the antenna may be achieved at the same time through proximity feeding and through incorporation of T-shaped stubs.

Figure 11B:
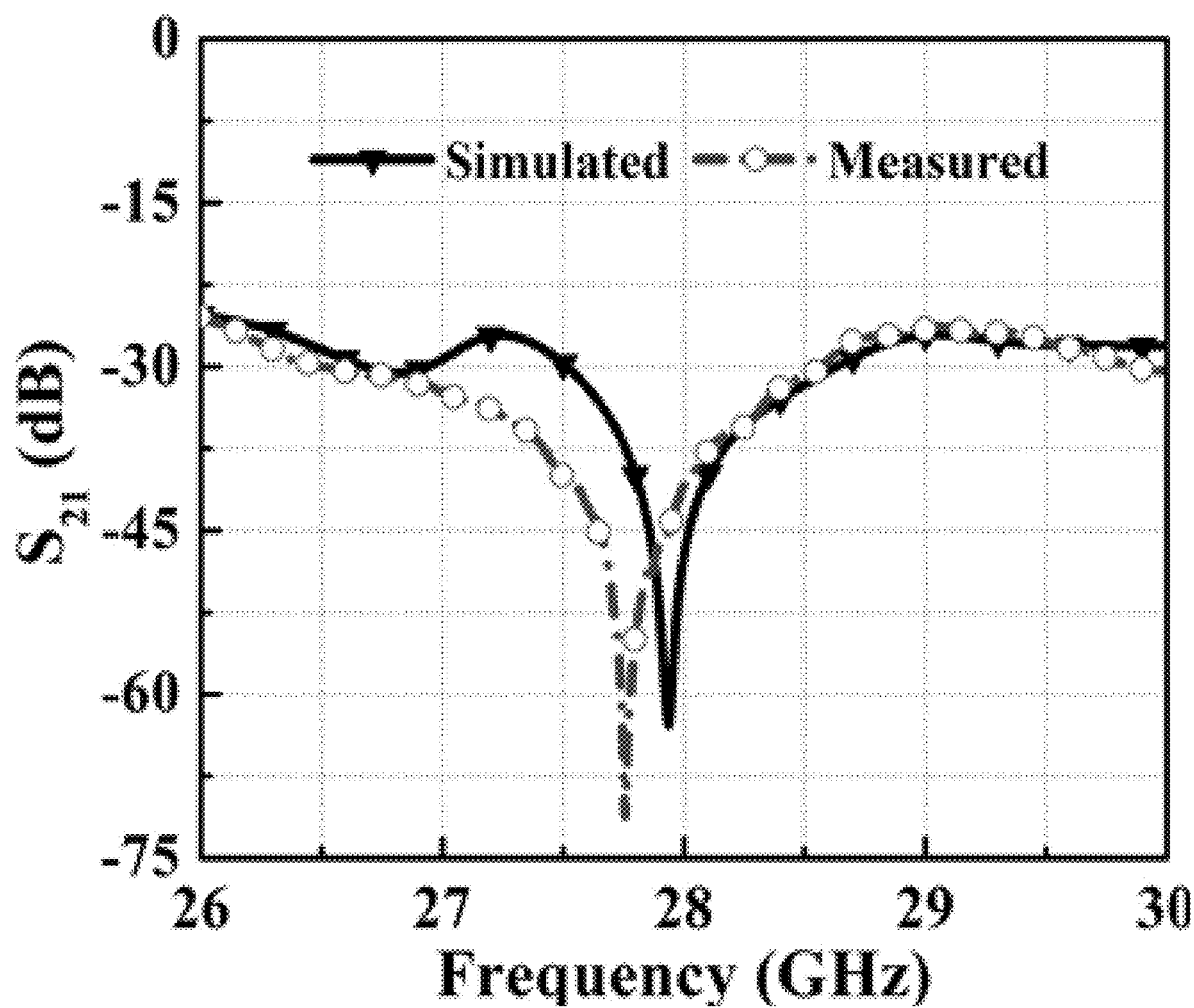

FIG. 11B is a graph illustrating measured isolation characteristics ($S_{21}$) for the prototype antenna array as a function of frequency. FIG. 11B also illustrates the simulated characteristics from FIG. 8B for the sake of comparison. The measurements confirm that insertion loss between the first and second ports of the antenna array ($S_{21}$) is at least −35.39 dB over the entire operating frequency range, a value of −65.41 at 27.94 GHz, and a minimum value is found to be −75.08 dB at 27.76 GHz. The shift in resonance toward a lower frequency, as compared to the simulation results, may be explained by the presence of a thin air gap between the two substrates in the antenna array and further attributable to fabrication tolerances.

Figure 12A:
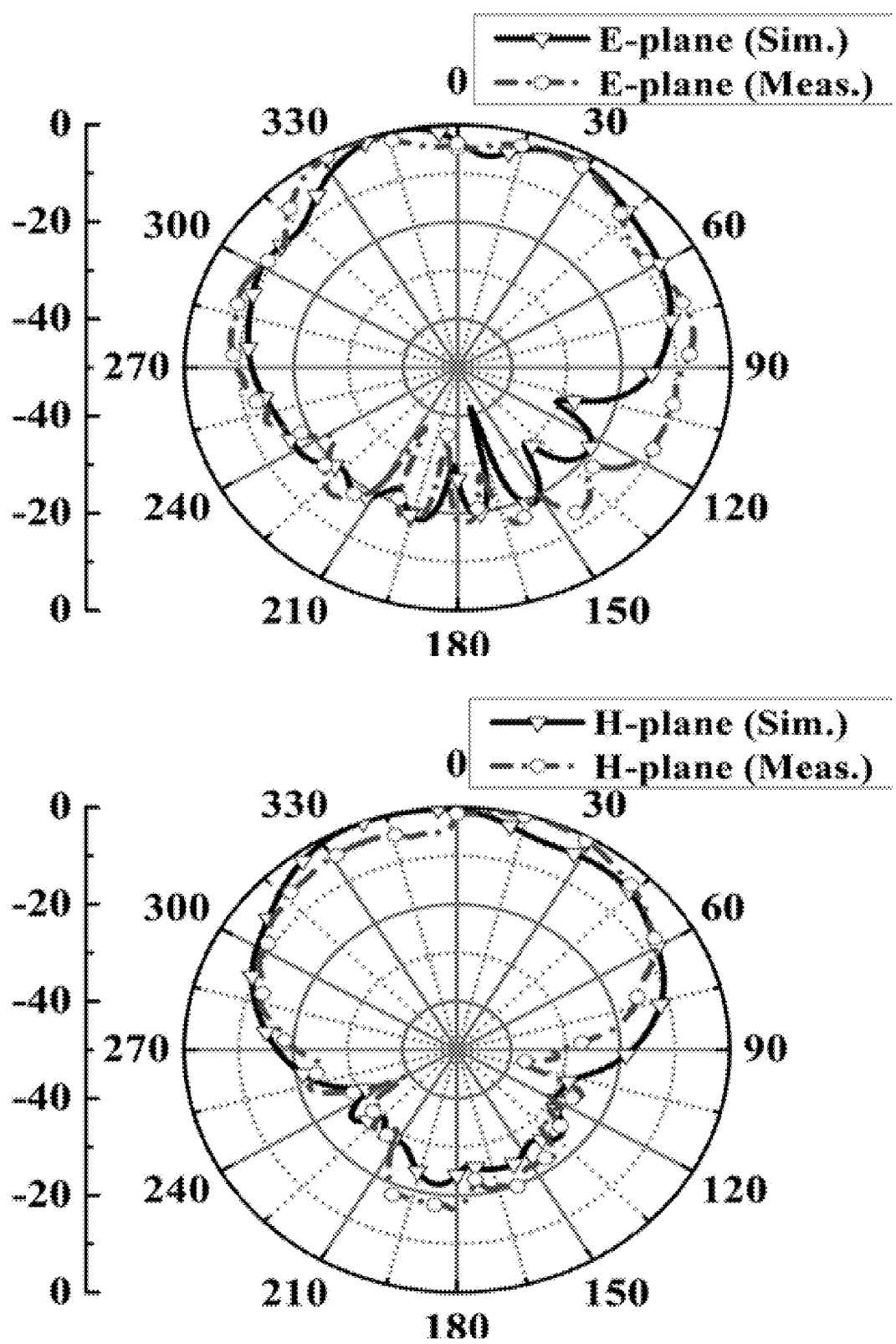
FIGS. 12A-C are graphs illustrating measured radiation patterns in both the E-plane and the H-plane for a prototype antenna array in accordance with an aspect of the disclosure.
Figure 12B:
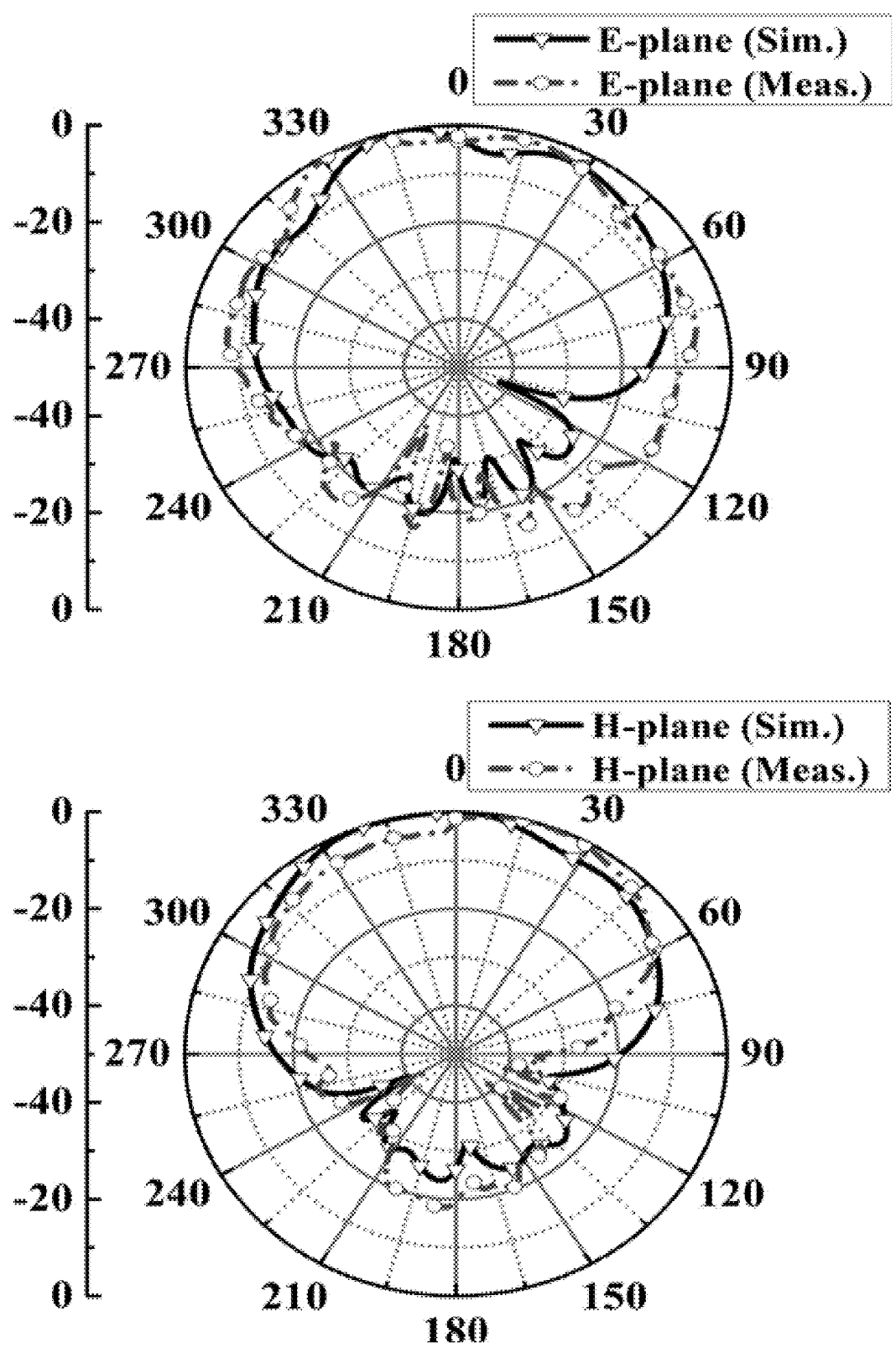
Figure 12C:
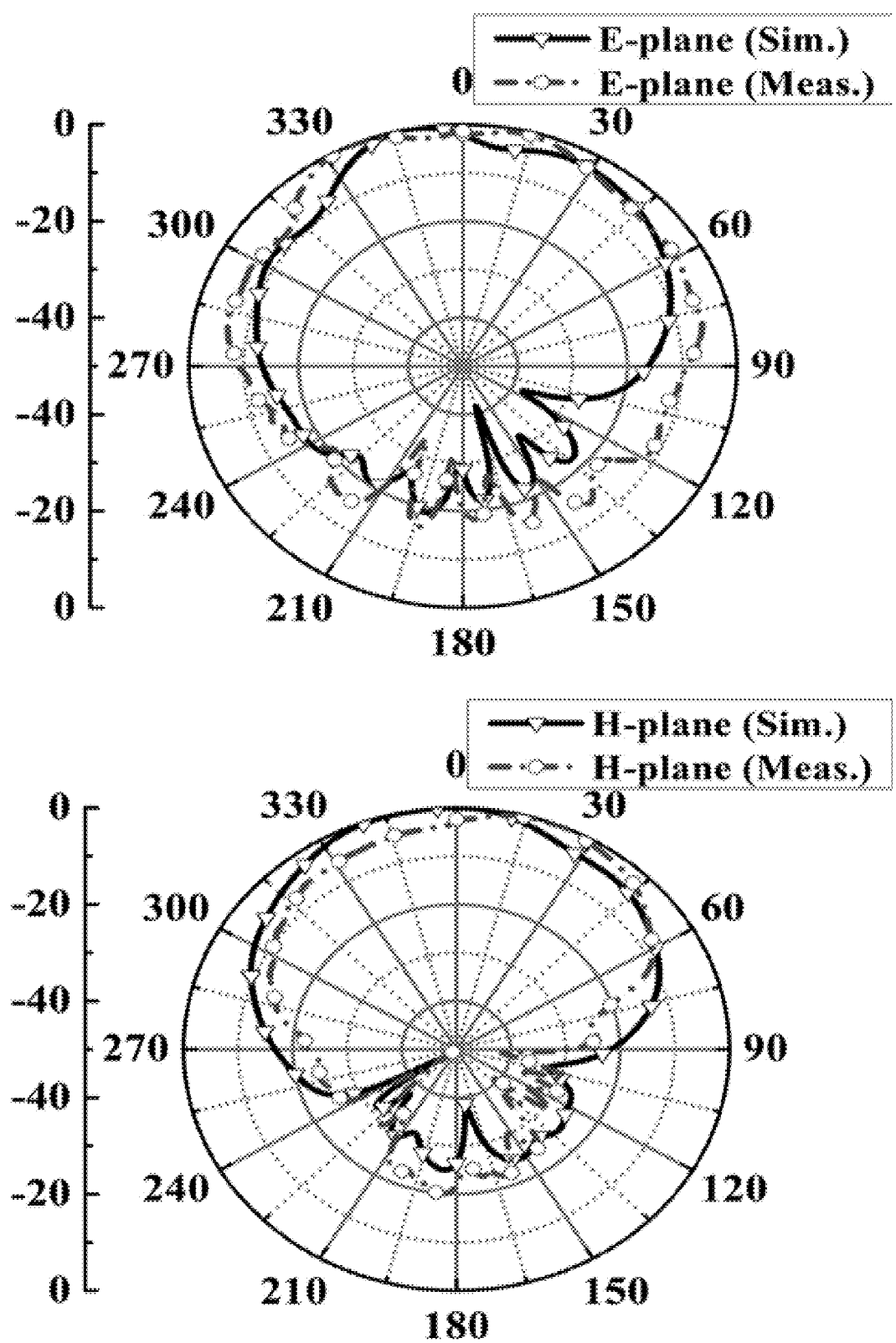

FIGS. 12A-12C are graphs illustrating measured radiation patterns in both the E-plane and the H-plane for the prototype MIMO antenna array operated at different operating frequencies. FIG. 12A shows the radiation pattern at 27.75 GHz, FIG. 12B shows the radiation pattern at 28 GHz, and FIG. 12C shows the radiation pattern at 28.25 GHz. The radiation patterns were measured by positioning the MIMO antenna array in an anechoic chamber and matched terminating one of the input ports of the antenna to a 50Ω broadband load. The measurement results show FTBR to be 19.44 dB, which confirms overall good accuracy of the simulated results of FIGS. 10A-10C.

Figure 13:
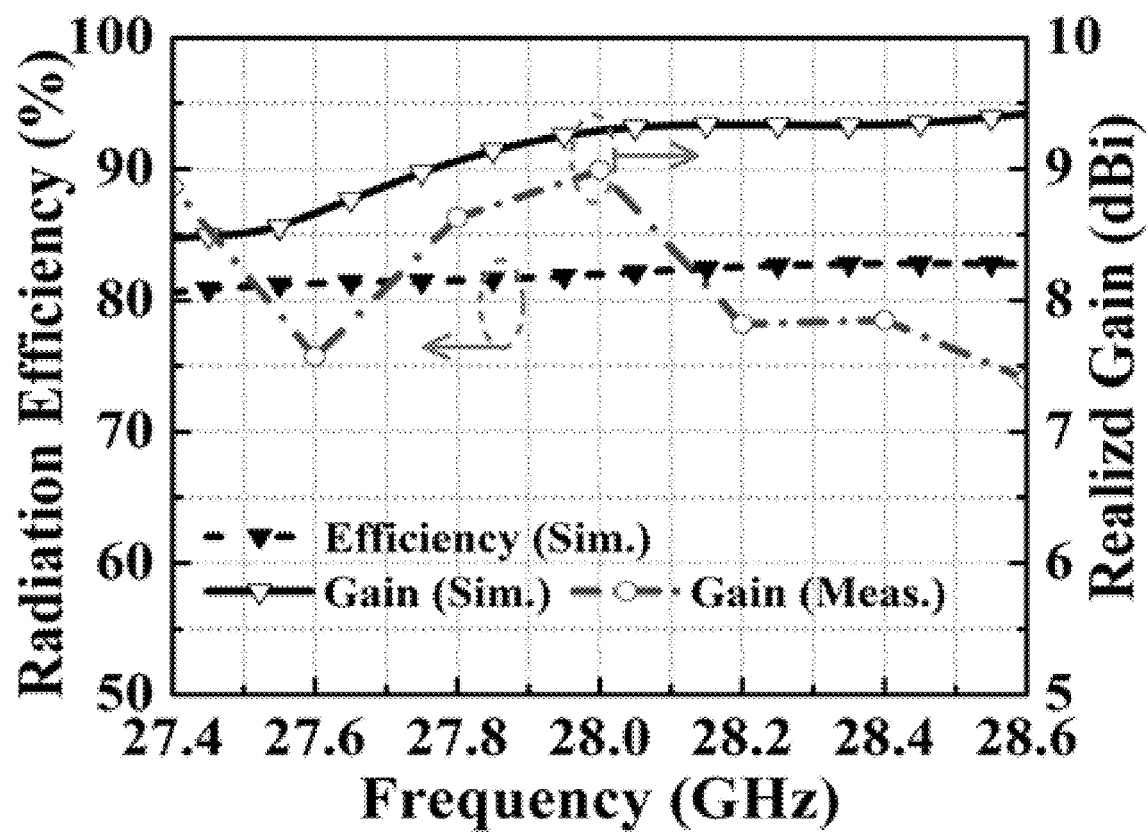
FIG. 13 is a graph illustrating efficiency and gain of MIMO antenna arrays in accordance with an aspect of the disclosure.

FIG. 13 is a graph illustrating efficiency of a simulated MIMO antenna array including an EBG lattice structure and a DGS as a function of frequency. As shown in FIG. 13, radiation efficiency is between about 82-84% within the operating frequency range of 27.75-28.25 GHz, and particularly 81.98% at 28 GHz.

FIG. 13 also illustrates gain according to simulations of a MIMO antenna array as well as measurements of the prototype MIMO antenna array. Loading the microstrip antennas of the MIMO antenna array with the EBG lattice structure forms a Fabry-Perot cavity resonance antenna, whereby multiple reflections inside the cavity of the antenna are capable of improving the antenna gain. The improved antenna gain can offset losses that typically occur through complex feed networks associated with large microstrip antenna arrays, particularly in millimeter wave frequency applications.

The prototype antenna can be measured by replacing the receiver with identical transmitting horns, such that the ratio of power from horn-to-horn ($P_S$) and horn-to-device under test ($P_T$) may be determined. Gain of the radiating patch of the device under test $G_T$ may be calculated according to the following equation:

$$G_T = G_S + 10 \log_{10}\left(\frac{P_T}{P_S}\right) \quad (3)$$

in which $G_S$ is the gain of the horn. As shown in FIG. 13, at 28 GHz, the simulated peak gain is 9.29 dBi, and the measured gain is 8.99 dBi.

Additionally, coupling between radiating elements of a MIMO antenna array may be characterized using an envelope correlation coefficient (ECC). A low ECC value is indicative of high channel capacity and good diversity of channels in the MIMO system.

A first method for calculating ECC is based on simulated or measured S-parameters, as shown in the following equation:

$$\rho_e = \frac{|S_{11} * S_{12} + S_{21} * S_{22}|^2}{(1 - |S_{11}|^2 - |S_{12}|^2)(1 - |S_{22}|^2 - |S_{12}|^2)} \quad (4)$$

Figure 14A:
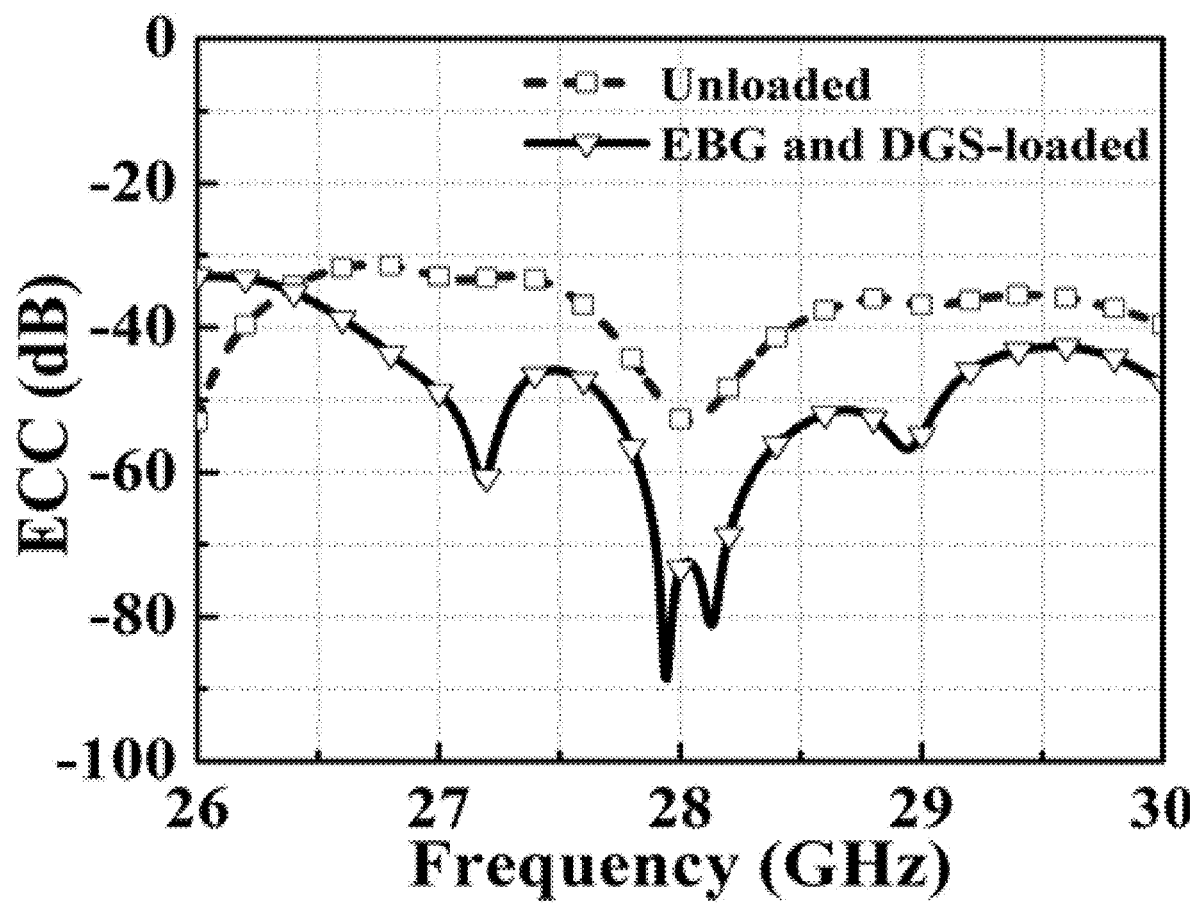
FIGS. 14A-B are graphs illustrating an envelope correlation coefficient (ECC) in accordance with an aspect of the disclosure.

FIG. 14A is a graph illustrating ECC according to the S-parameter based calculations of Equation (3). As shown in FIG. 14A, ECC of the antenna array is improved by 20.7 dB at 28 GHz by loading the radiation elements with thane EBG lattice structure and DGS.

A second method for calculating ECC is based on radiation field patterns $\vec{F}_i(\theta, \varphi)$, in which i=1, 2 for the two elements of the MIMO antenna array. The ECC according to this method may be calculated according to the following equation:

$$\rho_e = \frac{\left|\int\int_{4\pi} \vec{F}_1(\theta, \varphi)^* \cdot \vec{F}_2(\theta, \varphi)^* d\Omega\right|^2}{\int\int_{4\pi} |\vec{F}_1(\theta, \varphi)|^2 d\Omega \times \int\int_{4\pi} |\vec{F}_2(\theta, \varphi)| d\Omega^2} \quad (5)$$

Figure 14B:
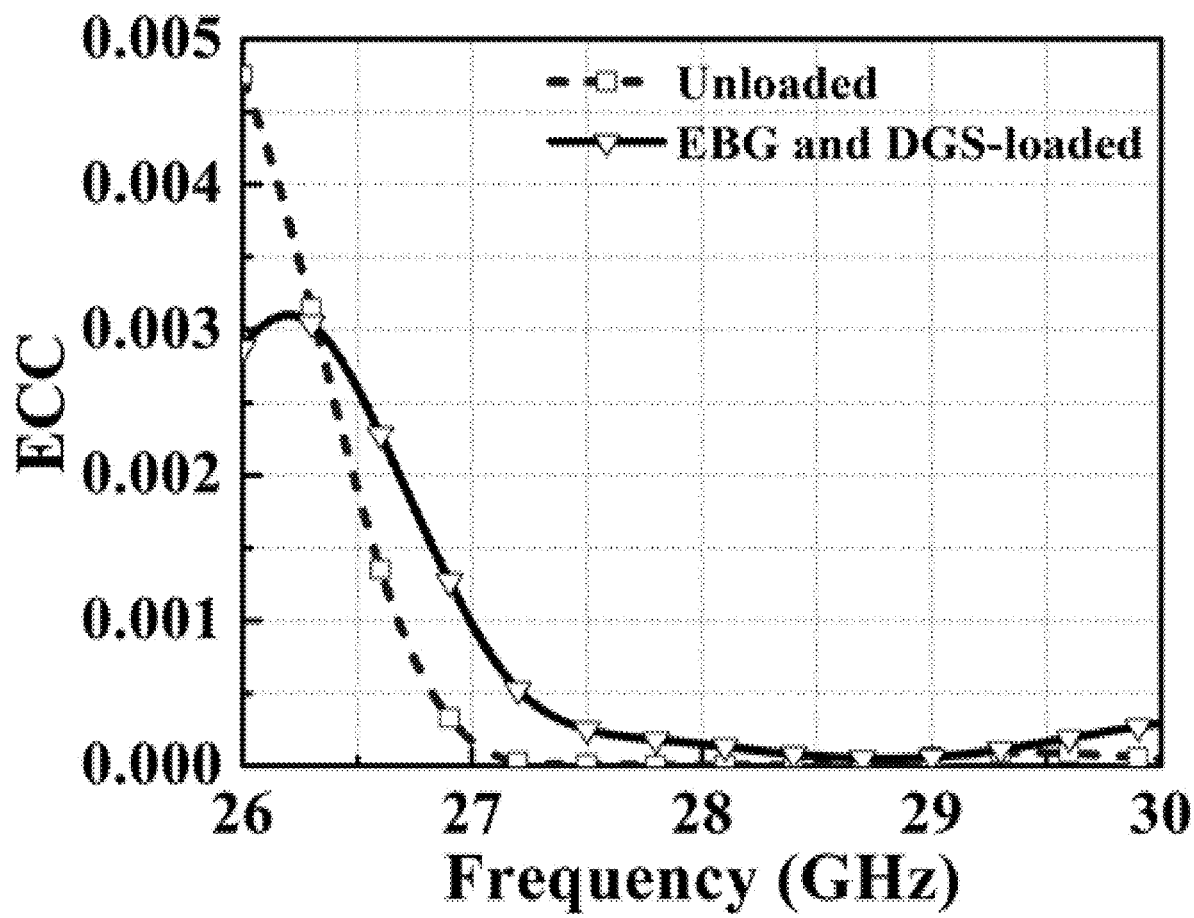

FIG. 14B is a graph illustrating ECC according to the radiation field pattern calculations of Equation (5). As shown in FIG. 14B, ECC of the antenna array is obtained to be 0.00015 using this equation.

The ECC calculations may further be used to determine diversity gain (DG) of the MIMO antenna array. DG may be determined according to the following equation:

$$DG = \sqrt{1 - |\rho_e|^2} \quad (6)$$

Plugging the value of ECC from FIG. 14B into Equation (6) yields an estimated DG of about 9.99 at 28 GHz.

The above described results are achieved while maintaining a relatively small size for the entire MIMO array. For instance, the MIMO antenna array shown in FIGS. 7A-7D is only 34.7 mm ($3.2\lambda_0$) long by 31.1 mm ($2.9\lambda_0$) wide and only 1.31 mm ($0.12\lambda_0$) thick, whereby $\lambda_0$ corresponds to an operating wavelength at 28 GHz. Thus, the above described antenna array provides a significant improvement to reducing mutual coupling without sacrificing size of the array. This makes the above described antenna array particularly useful for applications in which antenna hardware must be kept to a minimum size, such as in 5G portable wireless devices and in millimeter wave phased array and radar tracking systems.

Figure 15:
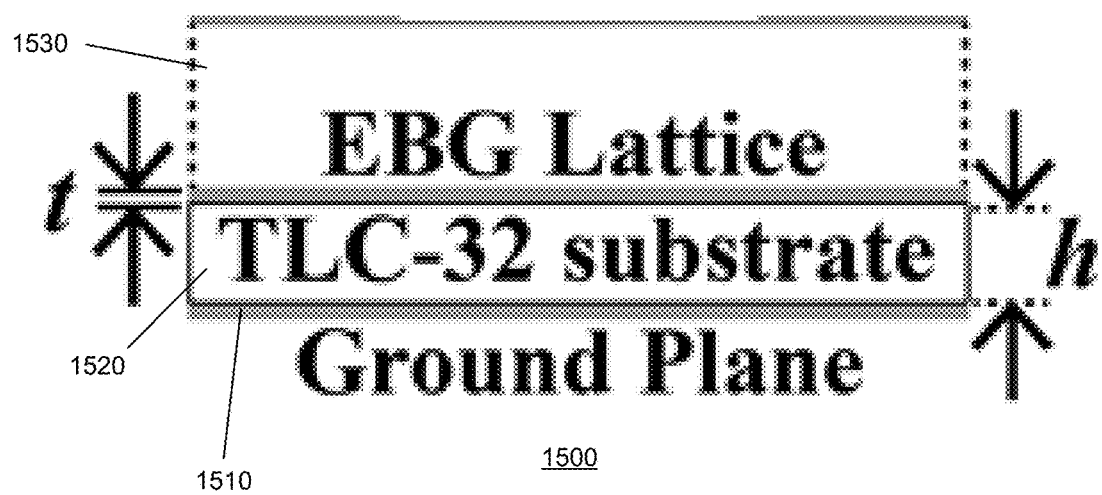
FIG. 15 is a side view schematic of another example EBG unit cell structure in accordance with an aspect of the disclosure.

FIG. 15 is a schematic side view of an alternative EBG unit cell structure 1500. The EBG unit cell structure 1500 includes a ground plane 1510, a dielectric substrate layer 1520 formed on a top surface of the ground plane 1510, and a metal layer 1530 formed on a top surface of the dielectric substrate layer 1520. The dielectric substrate layer 1520 has a height "h" and the metal layer 1530 has a thickness "t." The height and thickness of the layers may be the same as or different than the heights and thicknesses of layers described in connection to other EBG structures of the disclosure. The ground plane 1510 may be a continuous ground plane. In the example of FIG. 15, the dielectric substrate layer 1520 is a Taconic TLC-32 substrate, having a relative permittivity of $\varepsilon_r=3.2$ and an dielectric loss tangent of $\tan(\delta)=0.003$). The substrate 1520 also has a height in the Z-axis direction of about 0.79 mm. The metal layer 1530 has a thickness of 35 μm. The unit cell structure 1500 has a periodicity $P_C$ of 4.2 mm, which at an operational frequency of 9.88 GHz, amounts to $0.138\lambda_0$, which is less than a quarter but more than an eighth of the operational wavelength. The unit cell structure 1500 also has an overall height of 0.79 mm, which at the operational frequency of 9.88 GHz, amounts to $0.026\lambda_0$, which is less than a twentieth but more than a fortieth of the operational wavelength.

Figure 16:
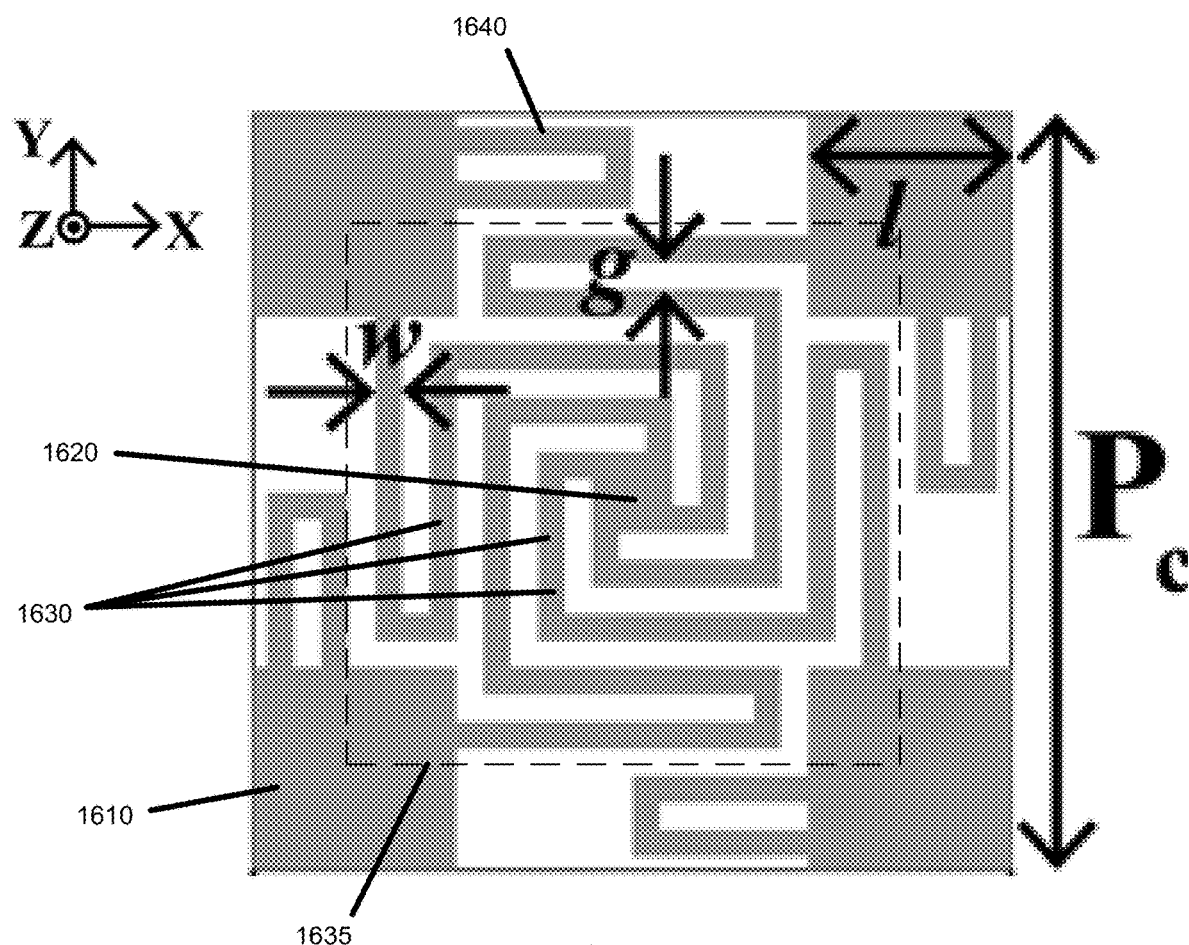
FIG. 16 is a top view of the EBG unit cell of FIG. 15.

The metal layer 1530 may be patterned in order to form an EBG lattice structure. FIG. 16 is a schematic top view of a pattern formed in the top layer 1530. A square-shaped corner patch 1610 is formed in each corner of the unit cell. The corner patch 1610 has a length and width "1." Each corner patch 1610 is connected to one another through a square-shaped central patch 1620 positioned at a center of the unit cell by a plurality of respective paths 1630. Each respective path connects a corresponding corner patch 1610 to the central patch 1620. The paths may have a uniform width "w," and be the same as one another, thus giving the pattern a 90° rotational symmetry. The paths may also be arranged in a spiral fashion, such that gaps having a uniform width "g" are formed between adjacent segments of the paths 1630. In the example of FIG. 16, a majority of the unit cell is filled entirely with the alternating paths and gaps. This results in a central region 1635 of the unit cell which contains the paths 1630 behaving as a spiral resonator. The corner patches 1610 provide for interconnection of adjacent cells. Intercell connection increases the surface current path between unit cells, which in turn increases the overall inductance of the lattice structure. Edges of the unit cell are occupied by additional paths 1640 that function as interdigital capacitors (IDCs). The IDCs increases capacitive coupling between nearby elements of the lattice structure. A geometry of the folds in the additional paths 1640 may dictate the overall capacitance of the structure.

Controlling either or both the inductance and capacitance of the lattice structure can enable control of the operating frequency of the structure. This is because the operating frequency of the structure is defined according to the following equation:

$$f=1/2\pi\sqrt{LC} \quad (7)$$

Additionally, controlling the inductance of the lattice structure can control an overall bandwidth of a frequency bandgap of the EBG structure. This is because the bandwidth increases as the inductance increases.

The example EBG unit cell structure 1500 of FIG. 15 may be particularly useful for applications within the X band (e.g., 8-12 GHz) of microwave frequencies, despite the relatively miniature size of the structure, both in terms of periodicity and height.

Figure 17:
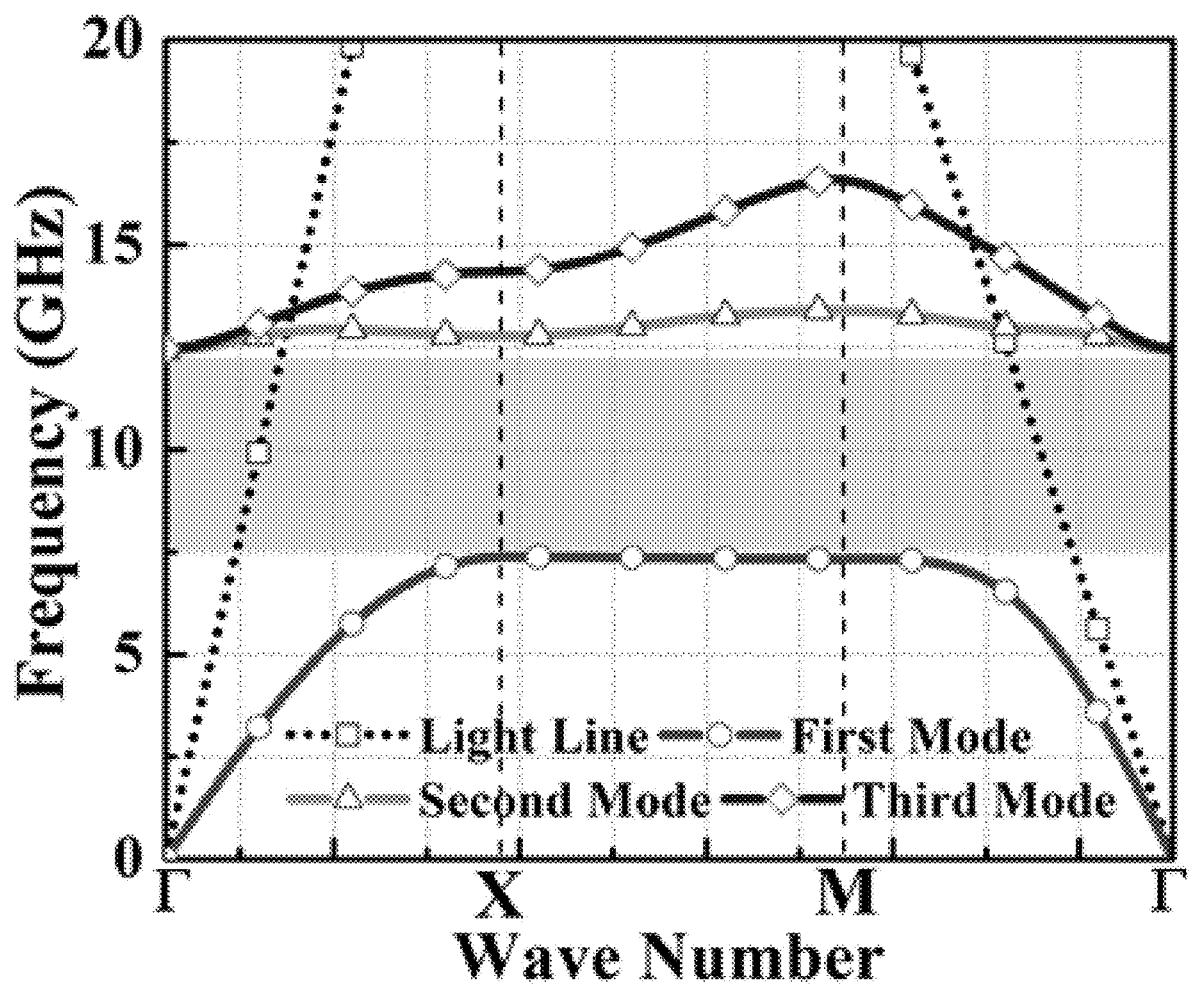
FIG. 17 is a graph showing dispersion characteristics of the EBG unit cell of FIG. 15.

Dispersion characteristics of the EBG unit cell structure are determined using full wave simulations in an Eigen mode solver. A periodic boundary condition is imposed in order to simulate a structure with an infinite array size. Additionally, the 90° rotational symmetry of the structure facilitates the determination of Eigen frequencies, since the determination can be focused to within the irreducible Brillouin zone. FIG. 17 is a graph showing the dispersion characteristics for the EBG unit cell structure of FIGS. 15 and 16. As shown in FIG. 17, the structure exhibits a frequency bandgap between 7.37-12.4 GHz between the first and second propagating modes. This amounts to an FBW of 50.89%.

An alternative way of characterizing the frequency bandgap of the EBG structure is to load a microstrip line with EBG structures symmetrically on both sides of the microstrip line. The result would be a 1 dimensional (linear) array of EBG unit cells on either side of the microstrip line.

Figure 18:
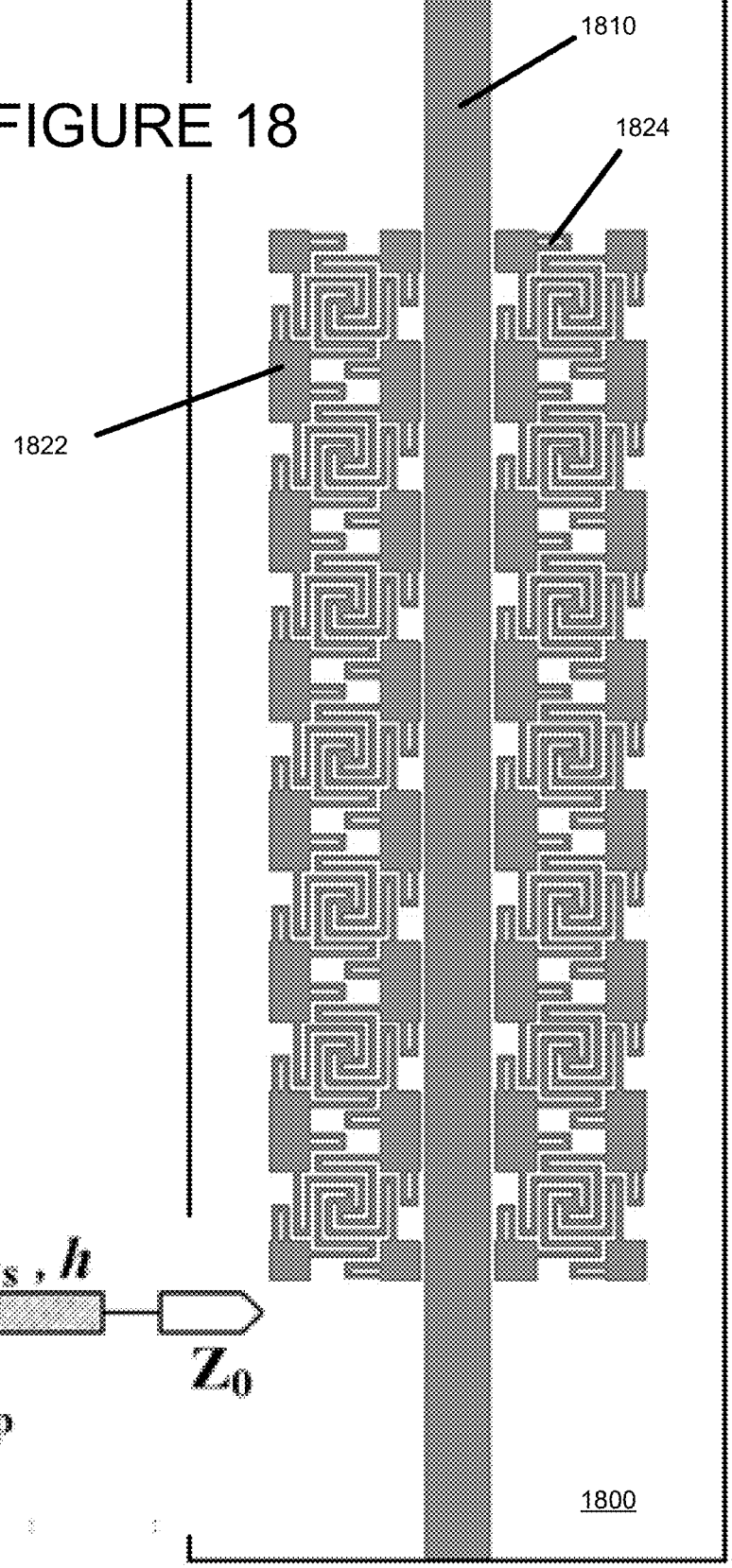
FIG. 18 is a top view schematic of a transmission line loaded using the EBG unit cell of FIG. 15.

FIG. 18 is a schematic top view of a simulation setup or arrangement 1800 of circuit elements including a microstrip line 1810 with a first linear array of EBG unit cells 1822 on a first side of the microstrip line 1810 and a second linear array of EBG unit cells 1824 on an opposing second side of the microstrip line 1810. The microstrip line may be a 50Ω line. Each linear array of EBG unit cells may have the same number of unit cells, and may be aligned with one another to provide the setup 1800 with a 180 degree rotational symmetry. In the example of FIG. 18, seven EBG unit cells are included in each linear array.

Capacitive coupling between the linear arrays of EBG unit cells 1822, 1824 and the microstrip line 1810 interacts with propagating TEM waves in the microstrip line. The capacitive coupling restricts propagation of EM waves over the frequency bandgap of the EBG unit cells due to the resonant nature of the EBG unit cells.

Figure 19:
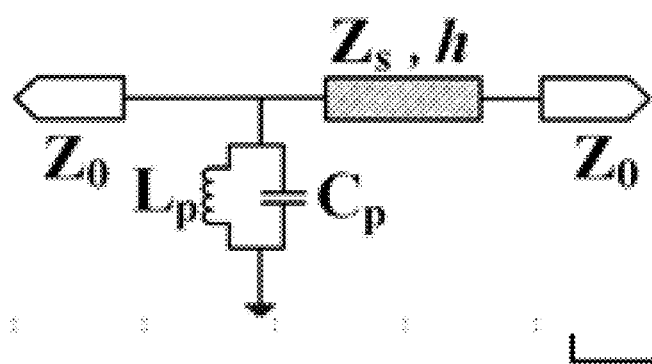
FIG. 19 is a circuit diagram showing an equivalent circuit of the transmission line of FIG. 18.

FIG. 19 is a circuit diagram showing an equivalent circuit of the arrangement 1800 in FIG. 18. The transmission line 1810 is represented as having an impedance $Z_s$, and the linear arrays of EBG unit cells 1822, 1824 are represented as a shunt LC circuit having a capacitance $C_p$ and an inductance $L_p$. The circuit diagram in FIG. 19 is a simplified equivalent circuit when a plane wave impinges on the EBG with the back side ground plane removed. In such a circumstance, the EBG exhibits frequency selective characteristics with a transmission band at the resonance frequency.

Figure 20:
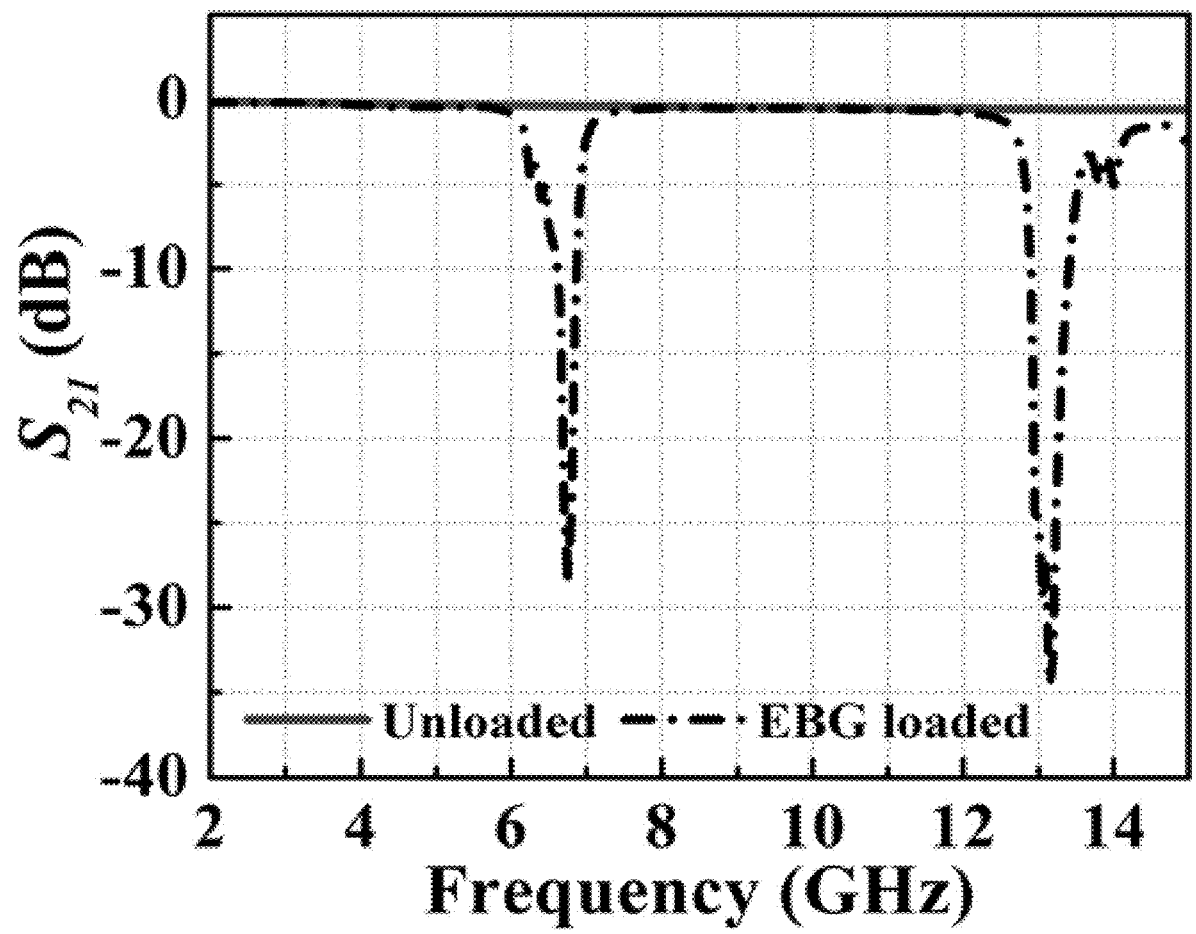
FIG. 20 is a graph showing transmission characteristics of the transmission line of FIG. 18.

A simulation of transmission characteristics for the EBG structure of FIG. 15 is shown in FIG. 20. FIG. 20 shows that the EBG structure produces two narrow stopbands on both sides of the frequency bandgap, in particular at 6.75 GHz and at 13.15 GHz. The 3 dB stopband bandwidths for these two bandgaps are seen to extend over 6.21-6.97 GHz (amounting to an FBW of 11.53%) and over 12.76-14.1 GHz (amounting to an FBW of 9.98%), respectively. Further simulation (not shown in FIG. 20) demonstrated that the number of unit cells included in each linear array controls the magnitude of the insertion loss at both stopbands.

The frequency bandgap produced by the example arrangement of FIG. 18 is capable of creating a mutual coupling between antenna elements of a MIMO antenna array. Due to the relatively miniature size of the EBG unit cell structure, the structure can be fit within a small space between antenna elements, enabling antenna elements and EBG structure of the MIMO antenna array to be packed together with a relatively higher packing density than in conventional arrays.

Figure 21:
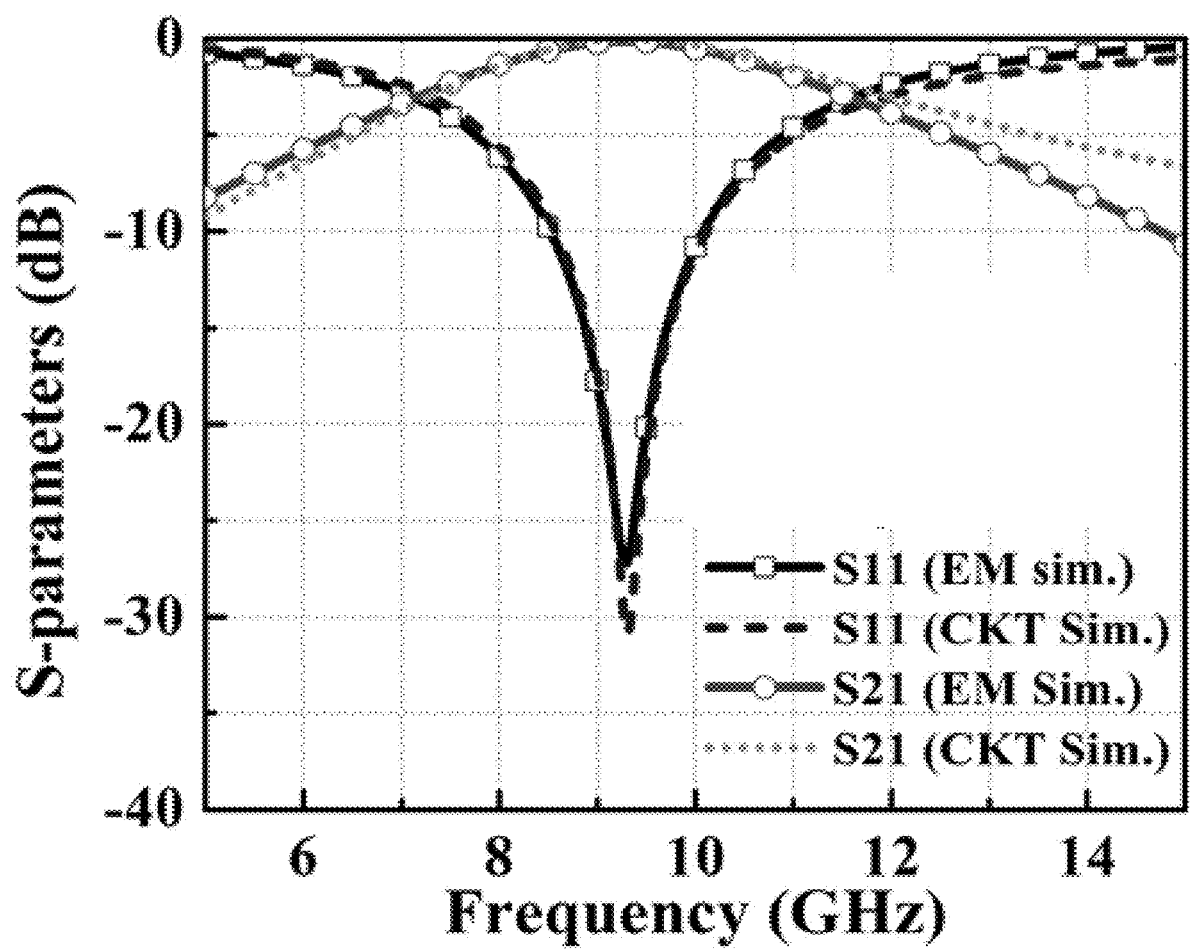
FIG. 21 is a graph showing transmission characteristics of a frequency selective surface (FSS) including the EBG unit cell of FIG. 15 for a plane wave incident to the FSS.

The example EBG unit cell structure 1500 of FIGS. 15 and 16 can also be applied as a frequency selective surface (FSS). FIG. 21 is a graph showing transmission characteristics of an FSS designed according to the EBG unit cell structure 1500. In FIG. 21, it can be seen that the FSS yields a transmission pole for which the center frequency is 9.3

GHz and for which a 3 dB passband extends across 7.1-11.65 GHz (amounting to a FBW of 48.53%). This makes the FSS particularly useful for application within the X-band range of frequencies.

Figure 22A:
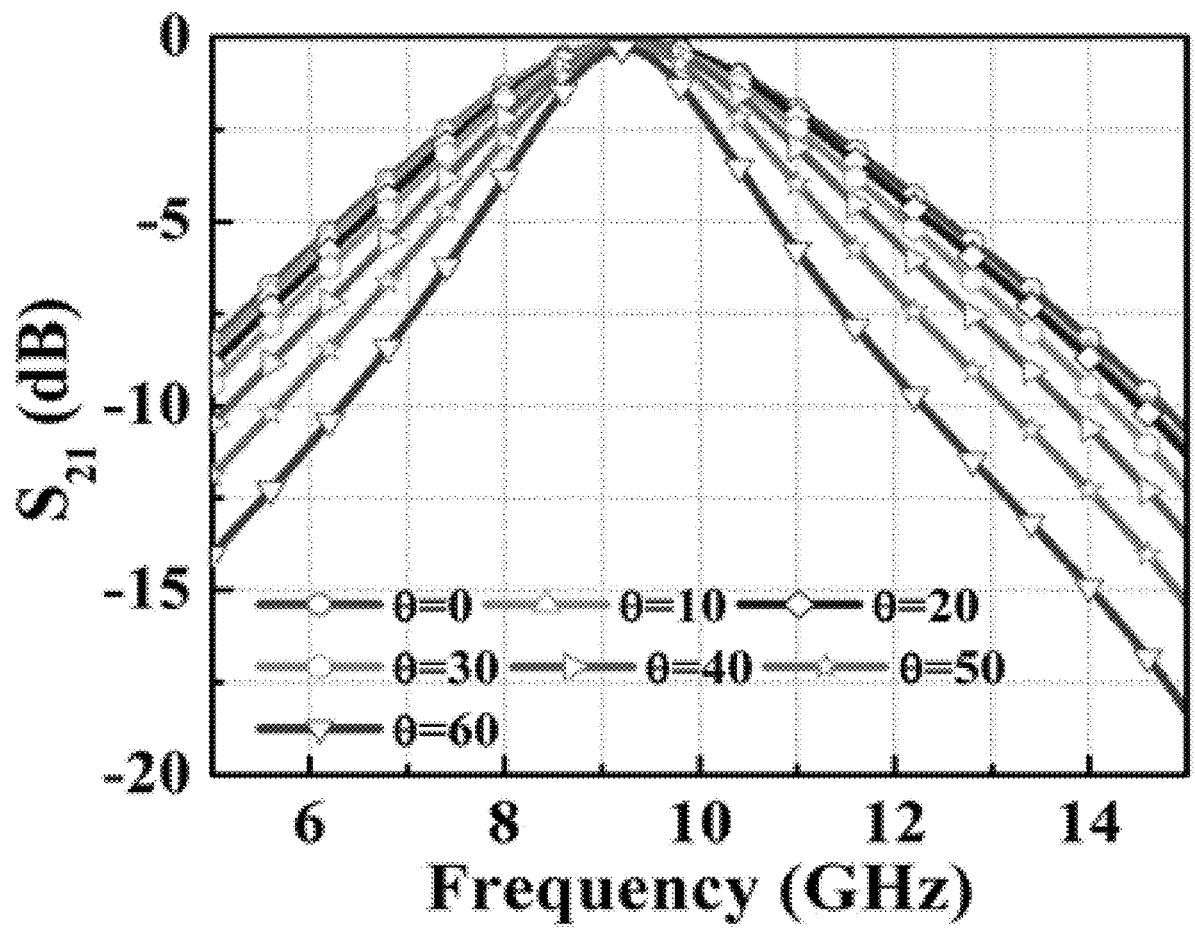
FIGS. 22A and 22B are graphs showing transmission characteristics of a frequency selective surface (FSS) including the EBG unit cell of FIG. 15 for electromagnetic (EM) waves at different angles of incidence to the FSS.
Figure 22B:
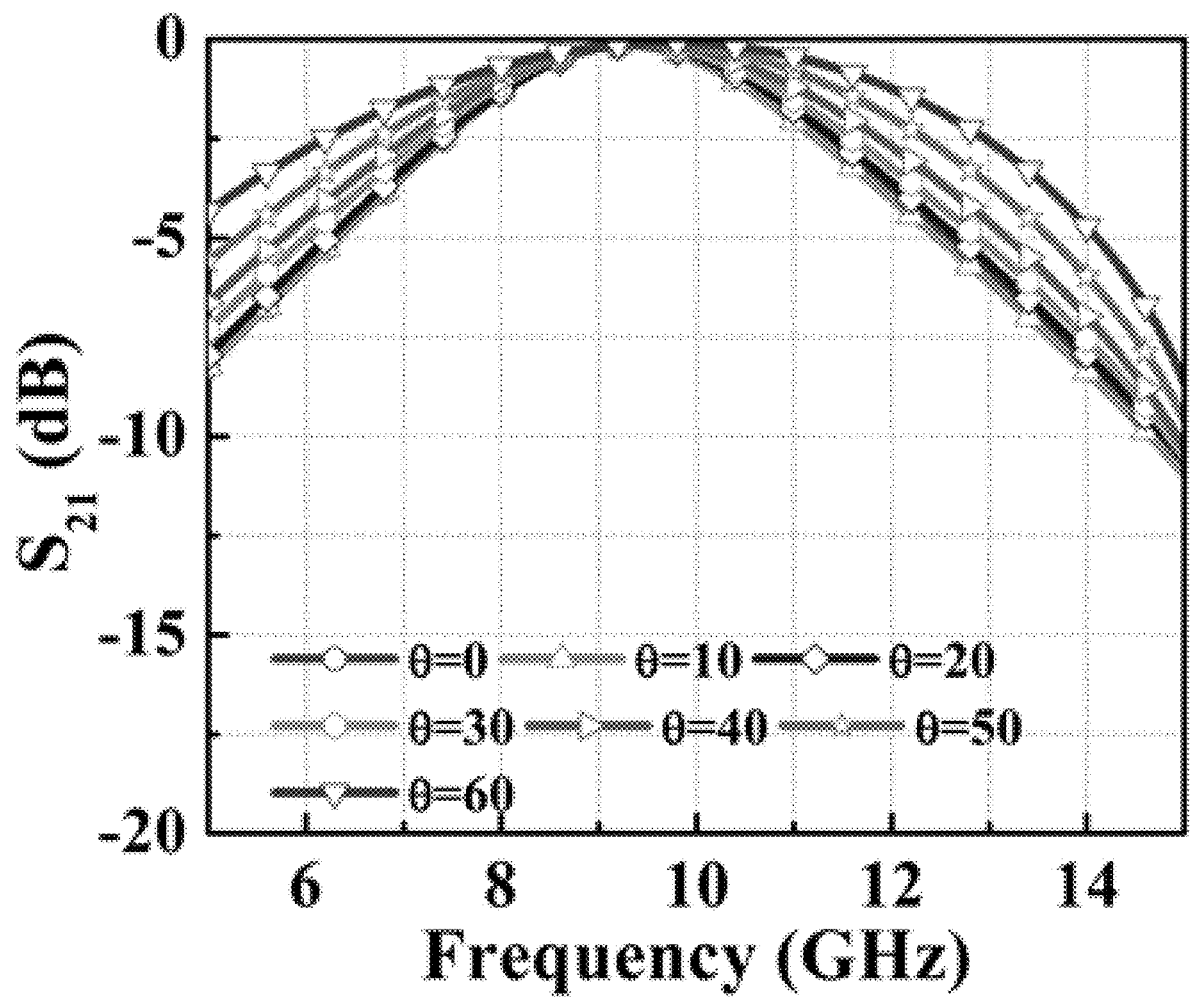

FIGS. 22A and 22B are graphs showing transmission characteristics of an FSS designed according to the EBG unit cell structure 1500. FIG. 22A shows characteristics for TE modes of electromagnetic (EM) waves at different angles of incidence to the FSS. FIG. 22B shows characteristics for TM modes of electromagnetic (EM) waves at different angles of incidence to the FSS. As can be seen from both FIGS. 22A and 22B, varying the angle of incidence of the EM waves up to at least 60° does not cause any significant shift in the transmission pole. Thus, the free space transmission characteristics of the EBG structure are shown to be invariant to change in incident angle for both TE and TM modes of propagation up to at least 60°.

Figure 23A:
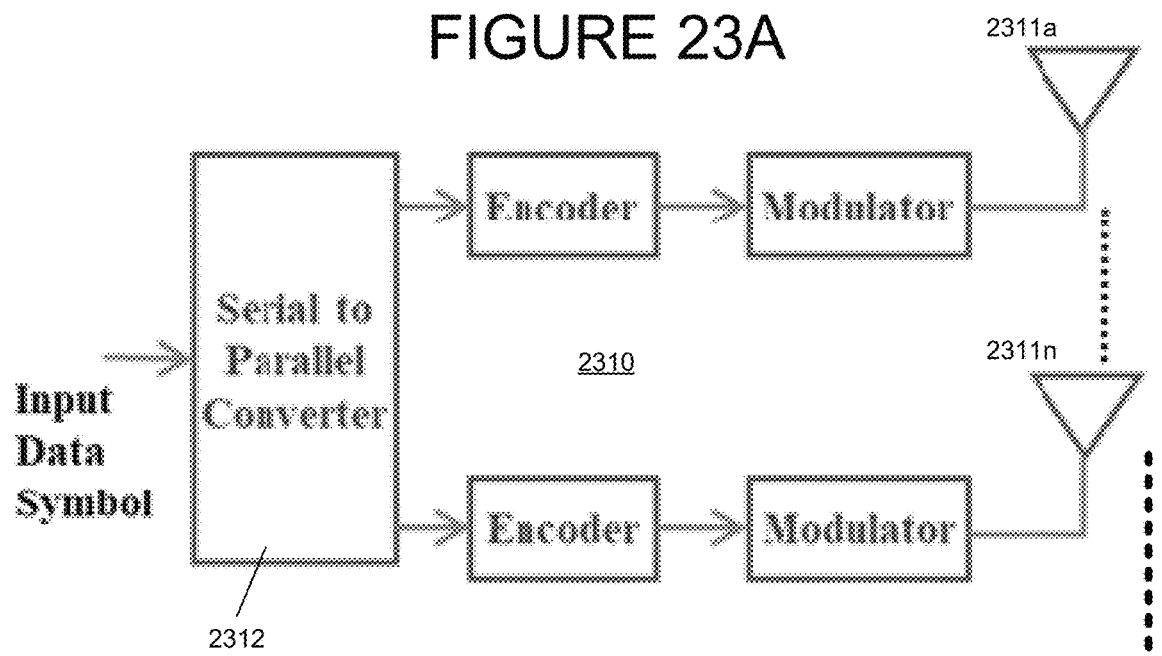
FIGS. 23A and 23B are block diagrams of a respective transmitter and receiver in a MIMO communication system.
Figure 23B:
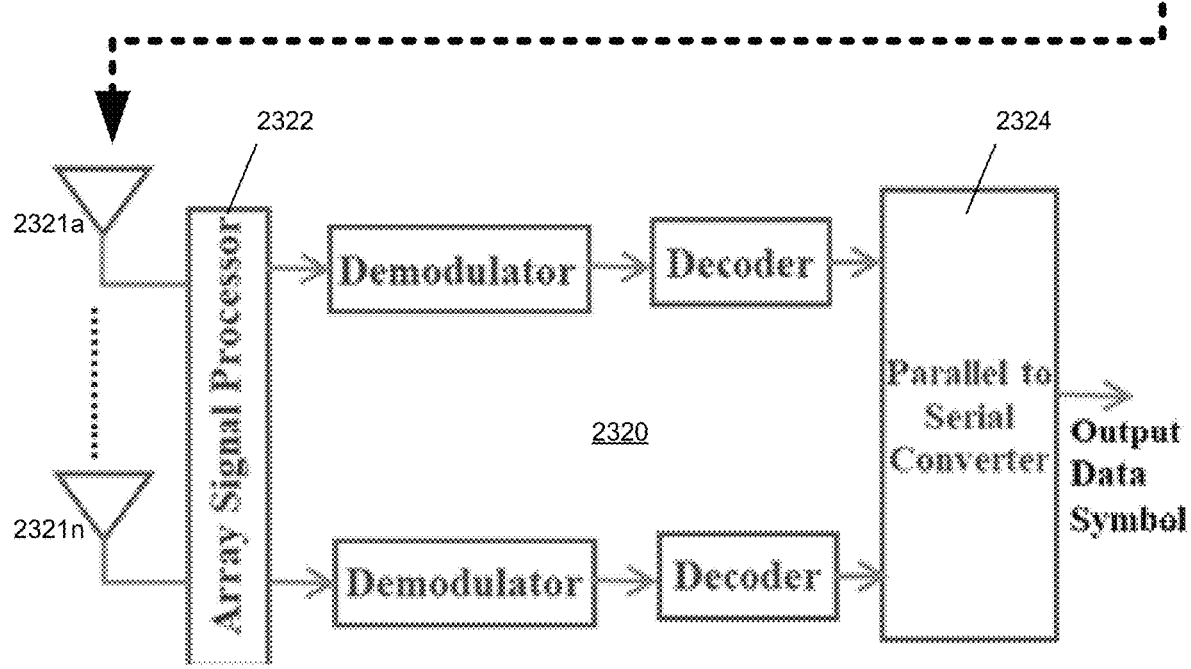

The above examples generally describe use of EBG structures in a MIMO antenna array in order to solve multipath propagation problems arising from close spacing between antenna elements of the MIMO array. An example system 2300 including a MIMO antenna array is shown in FIGS. 23A and 23B. The system 2300 includes a transmitter component 2310 including a plurality of transmitter antennas 2311a-2311n, and a receiver component 2320 including a plurality of receiver antennas 2321a-2321n. At the transmitter end, input data is fed through a serial-to parallel to converter 2312 and then processed and transmitted in parallel by the respective transmitter antennas 2311a-2311n and supporting circuit elements (e.g., encoders, modulators). At the receiver end, the transmitted data is received in parallel by the receiver antennas 2321a-2321n and processed through an array processor 2322. Further parallel processing is performed (e.g., using demodulators, decoders) before the received data is converted to output data by a parallel to serial converter 2324.

A size of the transmitter component 2310 and of the receiver component 2320 is dependent on inter-element spacing of the respective transmitter antennas 2311a-2311n and receiver antennas 2321a-2321n. The EBG unit cell structures described in the present disclosure are between an eighth and a quarter of an operating wavelength of the MIMO system in width, and have an even smaller profile in height, which means that the EBG structures positioned between antennas without taking up considerable space. This allows for the antennas to be positioned close to one another without resulting in mutual coupling (MC) between adjacent radiating elements due to free space radiations, surface currents, and surface waves. The avoidance of MC is particularly advantageous because MC can seriously degrade any one or combination of: signal-to-interference noise ratio (SINR) of an adaptive array; convergence of array signal processing algorithms; angle of arrival to estimate the carrier frequency offset; and impedance matching of an active antenna element. All of these unwanted effects due to MC have the additional unwanted effect of reducing channel capacity, data throughput, and spectral efficiency of the MIMO system, which in turn causes losses in bandwidth.

Consequently, the structures and techniques described in the present disclosure for achieving a reduction in MC (also termed as antenna decoupling) are a significant advancement in the field of MIMO, and particularly Massive MIMO. MIMO having a highly decoupled antenna array achieves a low value of envelope correlation coefficient (ECC), which in turn results in improvements to efficiency and diversity performance. This is especially necessary for the 5G frequency band at sub-6 GHz, since that band overlaps with both WLAN and WiMax frequencies, leaving limited available spectrum bandwidth for 5G applications. The use of MIMO at this and other 5G frequencies facilitates wider bandwidth for secure communications, such as short range communications and/or point to point communications.

Another application of the EBG unit cell structures of the present disclosure are as a partially reflective surface (PRS) over a patch antenna. The EBG-type metal layer superstrate, when loaded on a patch antenna, improves the radiation directivity of the antenna. This is often termed a Fabry-Perot cavity resonator antenna (FP-RCA). Tests have shown the gain of the antenna to be improved by 5-6 dB with the inclusion of a 7×7 array of EBG unit cell structures 1500 as shown in FIGS. 15 and 16.

The above described antenna array and components also have application to millimeter wave passive circuits such as filters and can be used to improve radiation performance in planar antennas. Including the antenna array of the present disclosure in PCBs can further help to reduce noise due to coupling between various analog and digital components.

The above examples generally describe applications within the X, Ku and Ka bands of the millimeter wave range. However, in other embodiments, applications within the V band may also be possible using the techniques and apparatuses described herein. For instance, the EBG-based structures can be upgraded to accommodate a 60 GHz band application, which is also useful for some 5G applications. This can be accomplished by further scaling down the structures using monolithic microwave integrated circuit (MMIC) or micromachining processes. For 60 GHz band communications, both the mutual coupling between adjacent radiating elements as well as limited transmission distance of the radiation elements impinge the performance of a MIMO antenna array. Performance metrics of a MIMO system rely on the overall MIMO element's gain and the coupling between ports. Therefore, the coupling between closely spaced antennas operating at or near a 60 GHz band should be reduced. This can be accomplished using the EBG structures of the present disclosure. A four-element or eight-element 60-GHz MIMO antenna array system can reasonably be developed for the 60 GHz applications using the EBG structures of the present disclosure with a scale factor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electromagnetic bandgap (EBG) lattice structure comprising a plurality of interconnected EBG unit cell structures, each EBG unit cell structure comprising:
  an electrically conductive ground plane;
  a first dielectric substrate formed on a top surface of the electrically conductive ground plane and having a first dielectric constant;
  a second dielectric substrate formed on a top surface of the first dielectric substrate and having a second dielectric constant different from the first dielectric constant, wherein the EBG unit cell structure is configured to reflect propagating millimeter waves at an interface between the first and second dielectric substrates; and a top metal layer formed on a top surface of the second dielectric substrate and including an EBG pattern formed in the top metal layer,
wherein an overall inductance of the EBG lattice structure is greater than an individual EBG unit cell structure, and
wherein a periodicity of the plurality of interconnected EBG unit cell structures satisfies a periodic boundary condition.

2. The EBG lattice structure of claim 1, wherein the EBG pattern has a periodicity that is between 2 mm and 10 mm.

3. An electromagnetic bandgap (EBG) unit cell structure comprising:
an electrically conductive ground plane;
a first dielectric substrate formed on a top surface of the electrically conductive ground plane and having a first dielectric constant;
a second dielectric substrate formed on a top surface of the first dielectric substrate and having a second dielectric constant different from the first dielectric constant, wherein the EBG unit cell structure is configured to reflect propagating millimeter waves at an interface between the first and second dielectric substrates; and
a top metal layer formed on a top surface of the second dielectric substrate and including an EBG pattern formed in the top metal layer,
wherein the EBG pattern comprises a ring divided into four sections separated from one another by respective gaps, and wherein each ring section includes a first end connected to a first metal strip extending radially in a direction toward a center of the EBG pattern and a second metal strip extending radially in a direction away from the center of the EBG pattern.

4. The EBG unit cell structure of claim 3, wherein each second metal strip is connected to a respective patch configured to connect to a corresponding coplanar patch of an adjacent EBG unit cell, and wherein each patch of the EBG pattern comprises a slit extending radially in a direction toward the center of the EBG pattern.

5. The EBG unit cell structure of claim 4, wherein a structure of the EBG pattern is defined by no more than: (i) a radial distance from the center to the ring; (ii) a radial distance from the center to the patch; (iii) a periodicity; (iv) a gap width; (v) a ring and metal strip width; and (vi) a slit length.

6. The EBG unit cell structure of claim 4, wherein an irreducible Brillouin zone of the EBG pattern is a triangular region designated by vertices Γ, X and M.

7. The EBG unit cell structure if claim 5, wherein the EBG pattern exhibits a frequency bandgap centered between 27-29 GHz and having a fractional bandwidth (FBW) of at least 20%.

8. The EBG lattice structure of claim 1, wherein the interconnected EBG unit cell structures is a 3×2 matrix of interconnected EBG unit cell structures.

9. The EBG lattice structure of claim 1, further comprising:
a first open ended transmission line formed in the top metal layer; and
a second open ended transmission line formed in the top metal layer, wherein the EBG pattern formed in the top metal layer is positioned between and loaded by the first and second open ended transmission lines.

10. The EBG lattice structure of claim 9, further comprising:
a middle metal layer positioned between the first dielectric substrate and the second dielectric substrate;
a substrate integrated waveguide (SIW) formed in the middle metal layer; and
a defected ground structure (DGS) formed in the ground plane.

11. The EBG lattice structure of claim 10, wherein the DGS is positioned directly underneath the EBG pattern.

12. A multiple-input multiple-output (MIMO) antenna array comprising:
a first proximity-coupled microstrip antenna;
a second proximity coupled microstrip antenna; and
the EBG lattice structure of claim 9.

13. The MIMO antenna array of claim 12, wherein the first and second open ended transmission lines are configured to create a transmission zero at or near the center of the frequency bandgap exhibited by the EBG lattice structure.

14. The MIMO antenna array of claim 13, wherein the center of the frequency bandgap is 27.5 GHz.

15. The MIMO antenna array of claim 12, wherein the first and second open ended transmission lines are configured to reduce coupling between the two microstrip antennas by at least 10 dB over a range from 27 GHz to 29 GHz.

16. A multiple-input multiple-output (MIMO) antenna array comprising:
a first proximity-coupled microstrip antenna;
a second proximity coupled microstrip antenna; and
the EBG lattice structure of claim 11.

17. The MIMO antenna array of claim 16, wherein the SIW is configured to embrace the first and second microstrip antennas and to confine propagation of surface waves to a space within the walls of the SIW cavity.

18. The MIMO antenna array of claim 16, wherein the SIW includes sidewalls comprising two rows of vias, and is configured to direct radiation of the first and second microstrip antennas in a single direction, wherein a front-to-back ratio of radiation in the MIMO antenna array is between 20 dB to 30 dB.

19. The MIMO antenna array of claim 16, wherein a vertical length of the DGS is 1.2 mm.

20. The MIMO antenna array of claim 16, wherein the antenna array is configured to operate at a millimeter wave operating frequency, and wherein each of a length and width of the EBG unit cell structure is about a quarter wavelength to a half wavelength of the operating signal wavelength of the MIMO antenna array.

21. The MIMO antenna array of claim 20, wherein the DGS has a length and width less than a wavelength of the operating signal wavelength of the MIMO antenna array.

22. The MIMO antenna array of claim 16, wherein the EBG lattice structure and the DGS are configured to reduce coupling between the two microstrip antennas by at least 12 dB over a range from 27 GHz to 29 GHz.

23. The MIMO antenna array of claim 16, wherein the EBG lattice structure and the DGS are configured to reduce $S_{11}$ and $S_{22}$ parameters of the MIMO antenna array by about 20 dB to 30 dB over a range from 28.75 GHz to 29.25 GHz.

24. The MIMO antenna array of claim 16, wherein the MIMO antenna array has a radiation efficiency of between about 82%-84% and an envelope correlation coefficient of about 0.00015.

25. The MIMO antenna array of claim 16, wherein the DGS is configured to improve an $S_{21}$ parameter of the MIMO antenna array by about 30 dB to 40 dB for at least one frequency between 27 GHz and 29 GHz.

26. An EBG lattice structure comprising a plurality of interconnected EBG unit cell structures, each EBG unit cell structure comprising:

an electrically conductive ground plane;

a dielectric substrate formed on a top surface of the electrically conductive ground plane; and a top metal layer formed on a top surface of the dielectric substrate and including an EBG pattern formed in the top metal layer, wherein the EBG pattern has a 90 degree rotational symmetry, wherein an overall inductance of the EBG lattice structure is greater than an individual EBG unit cell structure, and wherein a periodicity of the plurality of interconnected EBG unit cell structures satisfies a periodic boundary condition.

27. The EBG lattice structure of claim 26, wherein the EBG pattern comprises four corner patches positioned at respective corners of the top metal layer, and a central patch positioned at a center of the top metal layer, wherein central patch is connected to each corner patch by a respective path, and wherein the respective paths are configured to form a spiral resonator.

28. The EBG lattice structure of claim 27, wherein an irreducible Brillouin zone of the EBG pattern is a triangular region designated by vertices Γ, X and M.

29. The EBG lattice structure of claim 26, wherein the frequency bandgap has an FBW of about 50%.

30. A MIMO antenna array comprising:

a plurality of antennas; and one or more EBG lattice structures as recited in claim 26, wherein each pair of adjacent antennas is separated by a corresponding EBG lattice structure.

31. A partially reflective surface (PRS) comprising:

an EBG lattice structure as recited in claim 26, wherein the EBG lattice structure is positioned over a patch antenna.

32. The PRS of claim 31, wherein the EBG lattice structure is a 7×7 array of EBG unit cell structures.

33. A frequency selective surface (FSS) comprising an EBG lattice structure as recited in claim 26.

34. The FSS of claim 33, wherein a resonant frequency of the EBG lattice structure is consistent for electromagnetic waves of either TE or TM modes of propagation for an angle of incidence up to 60°.

35. The EBG lattice structure of claim 26, wherein the EBG pattern of each EBG unit cell structure has a periodicity between 3-6 millimeters.

36. The EBG lattice structure of claim 26, wherein the EBG pattern of each EBG unit cell structure exhibits a frequency bandgap for a range of frequencies at least in part between 8-12 GHz.

* * * * *